(12) United States Patent
Koseoglu

(10) Patent No.: US 11,884,888 B2
(45) Date of Patent: Jan. 30, 2024

(54) PROCESSES AND SYSTEMS FOR PRODUCING AROMATIC PRODUCTS AND HYDROGEN CARRIERS

(71) Applicant: Saudi Arabian Oil Company, Dhahran (SA)

(72) Inventor: Omer Refa Koseoglu, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/835,068

(22) Filed: Jun. 8, 2022

(65) Prior Publication Data

US 2023/0399575 A1    Dec. 14, 2023

(51) Int. Cl.
| | |
|---|---|
| C10G 69/08 | (2006.01) |
| C10G 69/10 | (2006.01) |
| C10G 67/02 | (2006.01) |
| B01D 3/14 | (2006.01) |
| B01D 3/10 | (2006.01) |

(52) U.S. Cl.
CPC ............. *C10G 69/08* (2013.01); *B01D 3/10* (2013.01); *B01D 3/143* (2013.01); *C10G 67/02* (2013.01); *C10G 69/10* (2013.01); *C10G 2300/1044* (2013.01); *C10G 2300/4006* (2013.01); *C10G 2300/4012* (2013.01); *C10G 2300/4018* (2013.01); *C10G 2400/30* (2013.01)

(58) Field of Classification Search
CPC ........ C10G 69/08; C10G 67/02; C10G 69/10; C10G 2300/1044; C10G 2300/4006; C10G 2300/4012; C10G 2300/4018; C10G 2400/30; B01D 3/10; B01D 3/143
See application file for complete search history.

(56) References Cited

U.S. PATENT DOCUMENTS

| | | |
|---|---|---|
| 4,594,145 A | 6/1986 | Roarty |
| 6,740,226 B2 | 5/2004 | Mehra et al. |
| 6,958,425 B1 | 10/2005 | Bogdan et al. |
| 7,566,394 B2 | 7/2009 | Koseoglu |
| 8,524,961 B2 | 9/2013 | Haizmann et al. |
| 8,721,927 B2 | 5/2014 | Koseoglu |
| 9,056,771 B2 | 6/2015 | Koseoglu et al. |
| 9,221,036 B2 | 12/2015 | Koseoglu et al. |
| 9,234,146 B2 | 1/2016 | Koseoglu |

(Continued)

FOREIGN PATENT DOCUMENTS

| | | |
|---|---|---|
| CN | 105623724 A | 6/2016 |
| JP | 2011251951 A | 12/2011 |

OTHER PUBLICATIONS

Al-Qahtani et al. "Multisite refinery and petrochemical network design: optimal integration and coordination." Industrial & Engineering Chemistry Research 48.2 (2009): 814-826.

(Continued)

*Primary Examiner* — Thuan D Dang
(74) *Attorney, Agent, or Firm* — Leason Ellis LLP

(57) ABSTRACT

The present disclosure is directed to refinery processes and systems for producing petrochemicals including aromatic products, and hydrogen carriers. Embodiments include those with increased naphtha production, increasing reformer feed. An aromatic rich stream is separated in an aromatic recovery complex to produce BTX, and all or a portion of BTX products subjected to hydrogenation to produce cyclohexanes.

20 Claims, 3 Drawing Sheets

(56) References Cited

U.S. PATENT DOCUMENTS

| | | |
|---|---|---|
| 9,359,917 B2 | 6/2016 | Koseoglu et al. |
| 10,081,009 B2 | 9/2018 | Koseoglu et al. |
| 10,422,046 B2 | 9/2019 | Koseoglu et al. |
| 11,046,898 B1 | 6/2021 | Koseoglu et al. |
| 2010/0143213 A1 | 6/2010 | Zimmerman et al. |
| 2012/0277503 A1 | 11/2012 | Wegerer et al. |
| 2013/0087483 A1 | 4/2013 | Haizmann et al. |
| 2013/0087484 A1 | 4/2013 | Haizmann et al. |
| 2015/0321976 A1 | 11/2015 | Larson et al. |
| 2018/0155638 A1* | 6/2018 | Al-Ghamdi .............. C10G 7/06 |
| 2018/0273859 A1 | 9/2018 | Frey et al. |
| 2021/0187487 A1 | 6/2021 | Arudra et al. |
| 2021/0253959 A1 | 8/2021 | Koseoglu et al. |
| 2021/0253962 A1 | 8/2021 | Hodgkins et al. |
| 2021/0261869 A1 | 8/2021 | Koseoglu et al. |
| 2021/0269724 A1 | 9/2021 | Hodgkins et al. |

OTHER PUBLICATIONS

Peyrovi et al. "Competitive hydrogenation of benzene in reformate gasoline over Ni supported on SiO2, SiO2—Al2O3, and Al2O3 catalysts: influence of support nature." Energy & Fuels 32.11 (2018): 11432-11439.

No Author. "Worldwide Fuel Charter." 5th edition. (Sep. 2013). 78 pages.

* cited by examiner

PROCESSES AND SYSTEMS FOR PRODUCING AROMATIC PRODUCTS AND HYDROGEN CARRIERS

FIELD OF THE DISCLOSURE

The present disclosure relates to refinery processes and systems for producing petrochemicals including aromatic products, and hydrogen carriers.

BACKGROUND OF THE DISCLOSURE

Crude oil originates from the decomposition and transformation of aquatic, mainly marine, living organisms and/or land plants that became buried under successive layers of mud and silt some 15-500 million years ago, and are essentially very complex mixtures of many thousands of different hydrocarbons. Depending on the source, the oil predominantly contains various proportions of straight and branched-chain paraffins, cycloparaffins, and naphthenic, aromatic, and polynuclear aromatic hydrocarbons. These hydrocarbons can be gaseous, liquid, or solid under normal conditions of temperature and pressure, depending on the number and arrangement of carbon atoms in the molecules. Crude oils vary widely in their physical and chemical properties from one geographical region to another and from field to field. Crude oils are usually classified into three groups according to the nature of the hydrocarbons they contain: paraffinic, naphthenic, asphaltic, and their mixtures. The differences are due to the different proportions of the various molecular types and sizes. One crude oil can contain mostly paraffins, another mostly naphthenes. Whether paraffinic or naphthenic, one can contain a large quantity of lighter hydrocarbons and be mobile or contain dissolved gases; another can consist mainly of heavier hydrocarbons and be highly viscous, with little or no dissolved gas. Crude oils can also include heteroatoms containing sulfur, nitrogen, nickel, vanadium and other elements in quantities that impact the refinery processing of the crude oil fractions. Light crude oils or condensates can contain sulfur in concentrations as low as 0.01 W % of sulfur; in contrast, heavy crude oils can contain as much as W %. Similarly, the nitrogen content of crude oils can range from 0.001-1.0 W %.

Processing options for crude oil fractions are typically as follows: light naphtha streams from crude oil distillation and/or from other processing units are sent to an isomerization unit to convert straight-chain paraffins into isomers which have higher octane numbers to produce gasoline blending component; heavy naphtha streams from crude oil distillation, coker, and cracking units are fed to a catalytic reformer after deep hydrodesulfurization and hydrodenitrogenation (for example, less than 0.5 ppmw of sulfur and less than 0.5 ppmw of nitrogen) to improve octane numbers, and products from the catalytic reformer can be blended into regular and premium gasolines for marketing; middle distillates from the crude oil distillation and other processing units are blended into diesel fuels, jet fuels and/or furnace oils, directly or following hydrotreating to obtain ultra-low sulfur diesel; vacuum gas oil is hydrocracked to produce diesel or fluid catalytically cracked to obtain gasoline and/or light olefins; the vacuum residue fraction can be subjected to hydroprocessing, delayed or fluid coking, thermal cracking, solvent deasphalting, gasification, or visbreaking.

Conventional refineries are designed and built to produce transportation fuels such as gasoline and diesel. Increasing demand for petrochemicals has led to the development of new processing options to convert crude oil, including for production of aromatics and light olefins. Aromatics are commonly produced by reforming, and a portion of that production typically is used in gasoline pools as octane boosters. In addition, steam cracking and fluid catalytic cracking are options for production of light olefins and aromatics.

Cyclohexane compounds including methyl cyclohexane have been considered as a liquid hydrogen source or a hydrogen carrier. Demand for alternative energy sources is increasing and humankind is attempting to move away from conventional petroleum-based fuels. Cyclohexane compounds are therefore attractive as they can provide an alternative energy source, and it can also be transported and distributed to end-users using a significant portion of the existing liquid fuel infrastructure.

In regard to the above background information, the present disclosure is directed to a technical solution for production of petrochemicals including aromatic products, and hydrogen carriers.

SUMMARY OF THE DISCLOSURE

The present disclosure is configured to optimize the production of hydrogen carrier molecules by producing more naphtha. In the example the mid-distillate/diesel fraction is subjected to a hydrocracking unit to produce more naphtha, rather than a conventional mid-distillate/diesel hydrotreating unit. An aromatic rich stream is separated in an aromatic recovery complex to produce benzene, toluene and a mixture of xylenes (BTX). Depending upon the target product slate, the aromatic separation complex can be designed and/or operated at full capacity or partial capacity. If benzene and p-xylene are the desired products, the aromatic separation can be designed to be operated at full capacity. Benzene and p-xylene are recovered as chemical products and toluene is sent for hydrogenation to produce cyclohexanes. If the objective is to produce the most hydrogen carrier molecules possible, the aromatic recovery can be modified by excluding xylenes separation and isomerization. In that embodiment, whole a xylenes (para, ortho and meta) product can also be sent to for hydrogenation. In additional embodiments, benzene can also be hydrogenated to add to the yield of cyclohexanes.

In certain embodiments, an integrated refinery process is provided, comprising the steps of:
  catalytically reforming naphtha-range hydrocarbons to produce reformate containing C6-C8 aromatic hydrocarbons, wherein the naphtha-range hydrocarbons are obtained from a source within the refinery selected from the group consisting of
    a first naphtha source consisting of naphtha-range hydrocarbons derived from naphtha hydrotreating of straight run naphtha,
    a second naphtha source consisting of naphtha-range hydrocarbons derived from hydrocracking of straight run middle distillates,
    a third naphtha source consisting of naphtha-range hydrocarbons derived from treatment of vacuum gas oil by hydrocracking or by fluid catalytic cracking,
    a fourth naphtha source consisting of naphtha-range hydrocarbons derived from treatment of vacuum residue by residue hydrotreating followed by hydrocracking, by residue hydrotreating followed by fluid catalytic cracking, or by coking,
    combinations comprising of two or more of the foregoing, and combinations comprising one or more of the foregoing and an additional deeply hydrotreated naphtha source; and reacting all or a portion of the reformate in the presence of a hydrogenation catalyst containing 0.01-5 wt % of one or more active metal components selected from Pt, Pd, Re and a combination comprising at least two of Pt, Pd or Re, on a catalyst support, at conditions including at a reactor temperature (° C.) in the range of from about 250-320, at a hydrogen partial pressure (bar) in the range of from about 20-100, at a hydrogen gas feed rate (standard liters per liter of hydrocarbon feed, SLt/Lt) of up to about 500-3000, and at a liquid hourly space velocity ($h^{-1}$), on a fresh feed basis relative to the hydrogenation catalysts, in the range of from about 0.1-5.0, the catalyst and conditions being effective to produce a liquid hydrogenation effluent in which at least about 95-99.9 wt % of C6-C8 aromatic hydrocarbons in the reformate are converted to cyclohexanes.

In certain embodiments, all or a portion of the hydrogenation effluent is transported as a hydrogen carrier and dehydrogenated to recover hydrogen.

In certain embodiments, the first naphtha source is one or more of the sources of naphtha-range hydrocarbons for reforming, and wherein the naphtha hydrotreating occurs in the presence of a naphtha hydrotreating catalyst selected from catalyst that contain one or more active metal component of metals or metal compounds (oxides or sulfides) selected from the Periodic Table of the Elements IUPAC Groups 6, 7, 8, 9 and 10 and at conditions including a reactor temperature (° C.) in the range of from about 250-400, a hydrogen partial pressure (bar) in the range of from about 10-80, a hydrogen gas feed rate (SLt/Lt) of up to about 100-500, and a liquid hourly space velocity ($h^{-1}$), on a fresh feed basis relative to the naphtha hydrotreating catalyst, in the range of from about 2-10. In certain embodiments, effluents from naphtha hydrotreating of straight run naphtha comprise a heavy fraction of naphtha-range hydrocarbons that is one or more of the sources of naphtha-range hydrocarbons for reforming, and a light fraction of naphtha-range hydrocarbons, and the process further comprise the steps of aromatizing all or a portion of the light fraction of naphtha-range hydrocarbons to produce an aromatic hydrocarbon stream comprising at least C6 and C7 aromatic hydrocarbons, and combining all or a portion of the aromatic hydrocarbon stream from aromatizing with the reformate reacting in the presence of the hydrogenation catalyst.

In certain embodiments, the second naphtha source is one or more of naphtha-range hydrocarbons for reforming, and wherein the hydrocracking of straight run middle distillates occurs in the presence of distillate hydrocracking catalyst selected from catalyst that have one or more active metal component of metals or metal compounds (oxides or sulfides) selected from the Periodic Table of the Elements IUPAC Groups 6, 7, 8, 9 and 10 carried on a support comprising acidic inorganic oxide and 0.1-20 wt % (relative to the total catalyst particle mass) of zeolite, and at conditions including a reactor temperature (° C.) in the range of from about 270-420, a hydrogen partial pressure (bar) in the range of from about 40-150, a hydrogen gas feed rate (SLt/Lt) of up to about 300-1000, and a liquid hourly space velocity ($h^{-1}$), on a fresh feed basis relative to the distillate hydrocracking catalysts, in the range of from about 1-4, the catalyst and conditions being effective to produce a middle distillate hydrocracking reactor liquid effluent comprising at least about 20-90 wt % of naphtha-range hydrocarbons.

In certain embodiments, the third naphtha source is one or more of naphtha-range hydrocarbons for reforming, wherein treatment is hydrocracking, and wherein the hydrocracking of vacuum gas oil occurs in the presence of a VGO hydrocracking catalyst selected from catalyst that have one or more active metal component of metals or metal compounds (oxides or sulfides) selected from the Periodic Table of the Elements IUPAC Groups 6, 7, 8, 9 and 10, and at conditions including a reactor temperature (° C.) in the range of from about 300-450, a hydrogen partial pressure (bar) in the range of from about 60-150, a hydrogen gas feed rate (SLt/Lt) of up to about 800-2500, and a liquid hourly space velocity ($h^{-1}$), on a fresh feed basis relative to the distillate hydrocracking catalysts, in the range of from about 0.1-10, the catalyst and conditions being effective to produce a vacuum gas oil hydrocracking reactor liquid effluent comprising at least about 10-80 wt % of naphtha-range hydrocarbons. In certain embodiments, the third naphtha source is one or more of naphtha-range hydrocarbons for reforming, wherein treatment is fluid catalytic cracking, and wherein the fluid catalytic cracking of vacuum gas oil occurs in the presence of VGO FCC catalyst selected from zeolites Y, REY, USY, Beta and RE-USY, and at conditions including a reactor temperature (° C.) in the range of from about 480-550, a reaction pressure (bar) in the range of from about 1-20, a contact time (in the reactor, seconds) in the range of from about and a catalyst-to-feed ratio (mass/mass) in the range of from about 1:1 to 10:1, the catalyst and conditions being effective to produce a vacuum gas oil fluid catalytic cracking reactor liquid effluent comprising at least about 30-80 wt % of naphtha-range hydrocarbons.

In certain embodiments, the fourth naphtha source is one or more of naphtha-range hydrocarbons for reforming, the catalyst and conditions being effective to produce a vacuum residue reactor effluent comprising at least about 5-40 wt % of naphtha-range hydrocarbons.

In certain embodiments, wherein the reformate is separated an aromatic-rich fraction and an aromatic-lean fraction, and all or a portion of the aromatic-rich fraction is reacted to produce hydrogenation effluent, wherein the total initial reactants to produce hydrogenation effluent contains at least about 90-99 wt % aromatic hydrocarbons.

In certain embodiments: the reformate is processed and separated in an aromatic recovery complex by separating the reformate into a first portion containing C6 aromatic hydrocarbons and a second portion containing C7-C8+ aromatic hydrocarbons, separating the first portion of the reformate into benzene and non-aromatics, separating the second portion of the reformate into toluene and a C8+ aromatic hydrocarbon fraction, separating the C8+ aromatic hydrocarbon fraction into a C8 aromatic hydrocarbon fraction and a C9+ aromatic hydrocarbon fraction, separating the C8 aromatic hydrocarbon fraction into para-xylene, and other C8 aromatic hydrocarbons, and isomerizing the other C8 aromatic hydrocarbons to produce additional para-xylenes and C8+ hydrocarbons that are recycled to separation of the C8+ aromatic hydrocarbon fraction derived from the second portion of the reformate; all or a portion of the toluene is the portion of the reformate that is reacted to produce hydrogenation effluent; and benzene and para-xylene are recovered as chemical products. In certain embodiments: the reformate is processed and separated in an aromatic recovery complex by separating the reformate into a first portion containing C6 aromatic hydrocarbons and a second portion containing C7-C8+ aromatic hydrocarbons, separating the first portion of the reformate into benzene and non-aromatics, separating the second portion of the reformate into toluene and a C8+ aromatic hydrocarbon fraction, and separating the C8+ aromatic hydrocarbon fraction into a C8 aromatic hydrocarbon fraction and a C9+ aromatic hydrocarbon fraction; all or a portion of the toluene and all or a portion of the C8 aromatic hydrocarbon fraction are portions of the reformate that are reacted to produce hydrogenation effluent; and benzene is recovered as a chemical product. In certain embodiments, the C8 aromatic hydrocarbon fraction is not subjected from additional separation or reaction prior to reacting to produce hydrogenation effluent. In certain embodiments, prior to separating the reformate into a first portion containing C6 aromatic hydrocarbons and a second portion containing C7-C8+ aromatic hydrocarbons, the reformate is separated an aromatic-rich fraction and an aromatic-lean fraction, and wherein the aromatic-rich fraction is separated into the first portion containing C6 aromatic hydrocarbons and the second portion containing C7-C8+ aromatic hydrocarbons.

In certain embodiments, an integrated refinery process is provided comprising:
  separating crude oil by atmospheric distillation into at least straight run naphtha, middle distillates, and atmospheric residue;
  separating atmosperic residue by vacuum distillation into at least vacuum gas oil and vacuum residue;
  hydrotreating the straight run naphtha to produce hydrotreated naphtha as a first naphtha source;
  hydrocracking the middle distillates to produce at least naphtha-range hydrocarbons as a second naphtha source;
  treating at least a portion of the vacuum gas oil to produce at least naphtha-range hydrocarbons as a third naphtha source, wherein treating is by hydrocracking or fluid catalytic cracking;
  optionally subjecting one or more of the first, second and third naphtha sources deep hydrodesulfurization and deep hydrodenitrogenation;
  catalytically reforming all or a portion of naphtha from the first, second and third naphtha sources, optionally subjected to deep hydrodesulfurization and deep hydrodenitrogenation, to produce reformate; and
  reacting all or a portion of the reformate in the presence of a hydrogenation catalyst containing 0.01-5 wt % of one or more active metal components selected from Pt, Pd, Re and a combination comprising at least two of Pt, Pd or Re, and on a support containing zeolite at a concentration range of 0.1-20 wt %, at conditions including at a reactor temperature (° C.) in the range of from about 250-320, at a hydrogen partial pressure (bar) in the range of from about 20-100, at a hydrogen gas feed rate (SLt/Lt) of up to about 500-3000, and at a liquid hourly space velocity ($h^{-1}$), on a fresh feed basis relative to the hydrogenation catalysts, in the range of from about 0.1-5.0, the catalyst and conditions being effective to produce a liquid hydrogenation effluent in which at least about 95-99.9 wt % of C6-C8 aromatic hydrocarbons in the reformate are converted to cyclohexanes.

In certain embodiments the process further comprises separating light naphtha from one or more of the first, second and third naphtha sources, optionally subjected to deep hydrodesulfurization and deep hydrodenitrogenation, aromatizing all or a portion of light fraction to produce an aromatic hydrocarbon stream comprising at least benzene, toluene, xylene, and C9+ aromatic hydrocarbons, and combining all or a portion of the aromatic hydrocarbon stream from aromatizing with the reformate. In certain embodiments the process further comprises treating at least a portion of the vacuum residue to produce at least naphtha-range hydrocarbons as a fourth naphtha source, wherein treating is by hydrotreating followed by hydrocracking, hydrotreating followed by fluid catalytic cracking, or delayed coking; optionally subjecting naphtha from the fourth naphtha source to deep hydrodesulfurization and deep hydrodenitrogenation, and wherein catalytic reforming further comprises reforming all or a portion of the fourth naphtha source, optionally subjected to deep hydrodesulfurization and deep hydrodenitrogenation. In certain embodiments the process further comprises gasifying heavy products from treating vacuum residue including pitch wherein treating is by hydrotreating followed by hydrocracking, heavy cycle oil wherein treating is by hydrotreating followed by fluid catalytic cracking, or heavy coker gas oil and/or coke wherein treating is by delayed coking, or coke wherein treating is by delayed coking; wherein gasifying produces hydrogen that used during reaction of reformate in the presence of a hydrogenation catalyst to produce cyclohexanes. In certain embodiments the process further comprises treating at least a portion of the vacuum residue by solvent deasphalting to produce asphalt and deasphalted oil, wherein all or a portion of the deasphalted oil is treated with vacuum gas oil. In certain embodiments the process further comprises gasifying asphalt from solvent deasphalting; wherein gasifying produces hydrogen that used during reaction of reformate in the presence of a hydrogenation catalyst to produce cyclohexanes.

In certain embodiments herein, the hydrogenation catalyst contains one or more active metal components selected from Pt, Pd, Re and a combination comprising at least two of Pt, Pd or Re, and wherein the catalyst support of the hydrogenation catalyst comprises zeolite at a concentration range of 0.1-20 wt % and non-acidic amorphous alumina. In certain embodiments herein, the hydrogenation catalyst contains one or more active metal components selected from Pt, Pd, Re and a combination comprising at least two of Pt, Pd or Re, and including a catalyst support comprising non-acidic amorphous alumina and about 0.1-15 wt % of a modified USY zeolite having one or more of Ti, Zr and/or Hf substituting aluminum atoms constituting the zeolite framework thereof.

Any combinations of the various embodiments and implementations disclosed herein can be used. These and other aspects and features can be appreciated from the following description of certain embodiments and the accompanying drawings and claims.

DETAILED DESCRIPTION OF CERTAIN EMBODIMENTS OF THE DISCLOSURE

Figure 1:
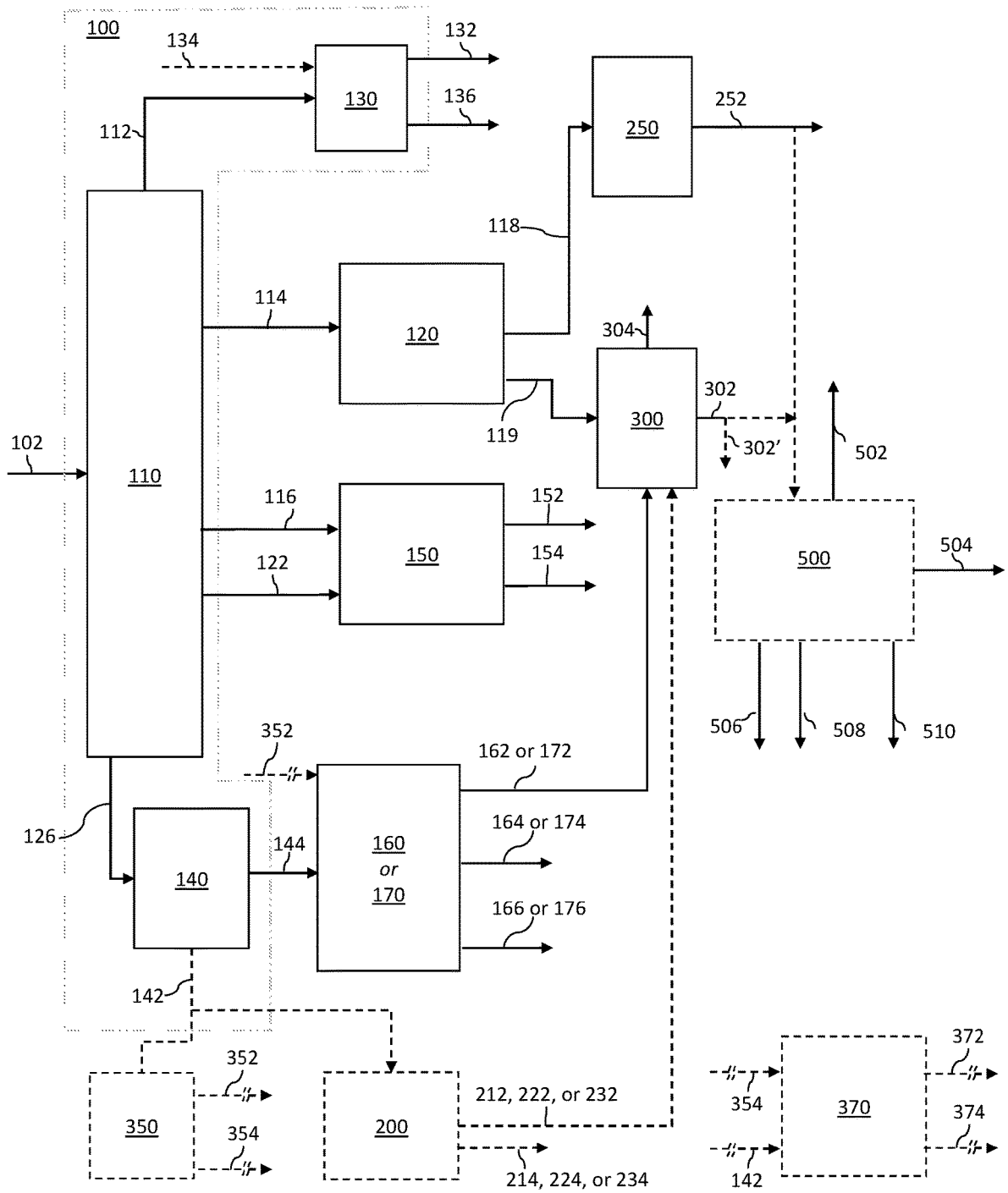
FIG. 1 is a simplified schematic diagram of an integrated fuel and petrochemical refinery complex.

The present disclosure is directed to refinery processes and systems for producing petrochemicals including aromatic products, and hydrogen carriers. Process scheme configurations are disclosed that enable conversion of crude oil feeds with several processing zones in an integrated manner into petrochemicals and hydrogen carriers. The integrated process includes conversion of certain refinery streams into aromatics including by naphtha reforming, and conversion of aromatics into hydrogen carriers by hydrogenation.

As used herein, the term "stream" (and variations of this term, such as hydrocarbon stream, feedstream, product stream, and the like), unless otherwise specified, may include one or more of various hydrocarbon compounds, such as straight chain, branched or cyclical alkanes, alkenes, alkadienes, alkynes, alkylaromatics, alkenyl aromatics, condensed and non-condensed di-, tri- and tetra-aromatics, and gases such as hydrogen and methane, C2+ hydrocarbons and further may include various impurities. The term "C #hydrocarbons" or "C #", is used herein having its well-known meaning, that is, wherein "#" is an integer value, and means hydrocarbons having that value of carbon atoms. The term "C #+ hydrocarbons" or "C #+" refers to hydrocarbons having that value or more carbon atoms. The term "C #−hydrocarbons" or "C #−" refers to hydrocarbons having that value or less carbon atoms. Similarly, ranges are also set forth, for instance, C1-C3 means a mixture comprising C1, C2 and C3. The term "zone" refers to an area including one or more equipment, or one or more sub-zones. Equipment may include one or more reactors or reactor vessels, heaters, heat exchangers, pipes, pumps, compressors, and controllers. Additionally, an equipment, such as reactors, dryers, or vessels, further may be included in one or more zones. Further, while not shown, light gases such as C1 and C2 gases from one or more zones can be used a fuel for one or more heaters within the system as is known.

Volume percent or "V %" refers to a relative value at conditions of 1 atmosphere pressure and 15° C. The phrase "a major portion" with respect to a particular stream or plural streams means at least about 50 weight percent (wt %) and up to 100 wt %, or the same values of another specified unit. The phrase "a significant portion" with respect to a particular stream or plural streams means at least about 75 wt % and up to 100 wt %, or the same values of another specified unit. The phrase "a substantial portion" with respect to a particular stream or plural streams means at least about 90, 95, 98 or 99 wt % and up to 100 wt %, or the same values of another specified unit. The phrase "a minor portion" with respect to a particular stream or plural streams means from about 1, 2, 4 or 10 wt %, up to about 20, 30, 40 or 50 wt %, or the same values of another specified unit.

The term "crude oil" as used herein refers to petroleum extracted from geologic formations in its unrefined form. Crude oil suitable as the source material for the processes herein include Arabian Heavy, Arabian Light, Arabian Extra Light, other Gulf crudes, Brent, North Sea crudes, North and West African crudes, Indonesian, Chinese crudes, North or South American crudes, Russian and Central Asian crudes, or mixtures thereof. The crude petroleum mixtures can be whole range crude oil or topped crude oil. As used herein, "crude oil" also refers to such mixtures that have undergone some pre-treatment such as water-oil separation; and/or gas-oil separation; and/or desalting; and/or stabilization. In certain embodiments, crude oil refers to any of such mixtures having an API gravity (ASTM D287 standard), of greater than or equal to about 20°, 30°, 32°, 34°, 36°, 38°, 40°, 42° or 44°. The term "condensates" refers to hydrocarbons separated from natural gas stream. As used herein, "condensates" also refers to such mixtures that have undergone some pre-treatment such as water-oil separation; and/or gas-oil separation; and/or desalting; and/or stabilization. In certain embodiments, condensates refer to any of such mixtures having an API gravity (ASTM D287 standard), of greater than or equal to about 45, 50, 60, or 65°.

As used herein, all boiling point ranges relative to hydrocarbon fractions derived from crude oil via atmospheric and/or vacuum distillation shall refer to True Boiling Point values obtained from a crude oil assay, or a commercially acceptable equivalent. The modifying term "straight run" is used herein having its well-known meaning, that is, describing fractions derived directly from the atmospheric distillation unit, optionally subjected to steam stripping, without other refinery treatment such as hydroprocessing, fluid catalytic cracking or steam cracking. An example of this is "straight run naphtha" and its acronym "SRN" which accordingly refers to "naphtha" defined herein that is derived directly from the atmospheric distillation unit, optionally subjected to steam stripping, as is well known. An example of this is "straight run middle distillates" which accordingly refers to "middle distillates" defined herein that is derived directly from the atmospheric distillation unit.

The acronym "LPG" as used herein refers to the well-known acronym for the term "liquefied petroleum gas," and generally is a mixture of C3-C4 hydrocarbons. In certain embodiments, these are also referred to as "light ends." The term "naphtha" as used herein refers to hydrocarbons having a nominal boiling range of about 20-205, 20-193, 20-190, 20-180, 20-170, 32-205, 32-193, 32-190, 32-180, 32-170, 36-205, 36-193, 36-190, 36-180 or 36-170° C. The term "light naphtha" as used herein refers to hydrocarbons having a nominal boiling range of about 20-110, 20-100, 20-90, 20-88, 32-110, 32-100, 32-90, 32-88, 36-110, 36-100, 36-90 or 36-88° C. The term "heavy naphtha" as used herein refers to hydrocarbons having a nominal boiling range of about 90-205, 90-193, 90-190, 90-180, 90-170, 93-205, 93-193, 93-190, 93-180, 93-170, 100-205, 100-193, 100-190, 100-180, 100-170, 110-205, 110-193, 110-190, 110-180 or 110-170° C. In certain embodiments naphtha, light naphtha and/or heavy naphtha refer to such petroleum fractions obtained by crude oil distillation, or distillation of intermediate refinery processes as described herein. The term "wild naphtha" is used herein to refer to naphtha products derived from hydroprocessing zones such as distillate hydrotreating zones, vacuum gas oil hydroprocessing zones and/or vacuum residue hydroprocessing zones. The term "kerosene" as used herein refers to hydrocarbons having a nominal boiling range of about 160-280, 160-270, 160-260, 170-280, 170-270, 170-260, 180-280, 180-270, 180-260, 190-280, 190-270, 190-260, 193-280, 193-270 or 193-260° C. The term "light kerosene" as used herein refers to hydrocarbons having a nominal boiling range of about 160-250, 160-235, 160-230, 160-225, 170-250, 170-235, 170-230, 170-225, 180-250, 180-235, 180-230, 180-225, 190-250, 190-235, 190-230 or 190-225° C. The term "heavy kerosene" as used herein refers to hydrocarbons having a nominal boiling range of about 225-280, 225-270, 225-260, 230-280, 230-270, 230-260, 235-280, 235-270, 235-260 or 250-280° C. The term "atmospheric gas oil" and its acronym "AGO" as used herein refer to hydrocarbons having a nominal boiling range of about 250-400, 250-380, 250-370, 250-360, 250-340, 250-320, 260-400, 260-380, 260-370, 260-360, 260-340, 260-320, 270-400, 270-380, 270-370, 270-360, 270-340 or 270-320° C. In certain embodiments, the term "middle distillate" is used with reference to one or more fractions containing hydrocarbons having a nominal boiling range of about 160-400, 160-380, 160-370, 160-360, 160-340, 170-400, 170-380, 170-370, 170-360, 170-340, 180-400, 180-380, 180-370, 180-360, 180-340, 190-400, 190-380, 190-370, 190-360, 190-340, 193-400, 193-380, 193-370, 193-360, or 193-340° C. In certain embodiments, the term "straight run middle distillate" is used with reference to one or more straight run fractions from the atmospheric distillation unit. In embodiments in which other terminology is used herein, the middle distillate fraction can also include all or a portion of AGO range hydrocarbons, all or a portion of kerosene, all or a portion of medium AGO range hydrocarbons, and/or all or a portion of heavy kerosene range hydrocarbons. In additional embodiments, term "middle distillate" is used to refer to fractions from one or more integrated operations boiling in this range. The term "atmospheric residue" and its acronym "AR" as used herein refer to the bottom hydrocarbons having an initial boiling point corresponding to the end point of the AGO range hydrocarbons, and having an end point based on the characteristics of the crude oil feed. The term "vacuum gas oil" and its acronym "VGO" as used herein refer to hydrocarbons having a nominal boiling range of about 370-565, 370-550, 370-540, 370-530, 370-510, 400-565, 400-550, 400-540, 400-530, 400-510, 420-565, 420-550, 420-540, 420-530 or 420-510° C. The term "vacuum residue" and its acronym "VR" as used herein refer to the bottom hydrocarbons having an initial boiling point corresponding to the end point of the VGO range hydrocarbons, and having an end point based on the characteristics of the crude oil feed.

The term "liquid effluent" is used herein having its known meaning, and refers to effluent from reactors after cooling to a temperature in the range of about 220-280° C. at a pressure of about 120-160 bar, after having gases including hydrogen and C1-C4 hydrocarbons separated therefrom.

The term "unconverted oil" and its acronym "UCO," is used herein having its known meaning, and refers to a highly paraffinic and naphthenic fraction from a hydrocracker with a low nitrogen, sulfur and nickel content and including hydrocarbons having a nominal boiling range with an initial boiling point corresponding to the end point of the AGO range hydrocarbons, in certain embodiments the initial boiling point in the range of about 340-370° C., for instance about 340, 360 or 370° C., and an end point in the range of about 510-565° C., for instance about 540, 550 or 565° C. UCO is also known in the industry by other synonyms including "hydrowax."

The term "fuels" refers to crude oil-derived products used as energy carriers. Fuels commonly produced by oil refineries include, but are not limited to, gasoline, jet fuel, diesel fuel, fuel oil and petroleum coke. Unlike petrochemicals, which are a collection of well-defined compounds, fuels typically are complex mixtures of different hydrocarbon compounds. The terms "kerosene fuel" or "kerosene fuel products" refer to fuel products used as energy carriers, such as jet fuel or other kerosene range fuel products (and precursors for producing such jet fuel or other kerosene range fuel products). Kerosene fuel includes but is not limited to kerosene fuel products meeting Jet A or Jet A-1 jet fuel specifications. The terms "diesel fuel" and "diesel fuel products" refer to fuel products used as energy carriers suitable for compression-ignition engines (and precursors for producing such fuel products). Diesel fuel includes but is not limited to ultra-low sulfur diesel compliant with Euro V diesel standards.

The term "aromatic hydrocarbons" or "aromatics" is well known, and refers to cyclically conjugated hydrocarbons with a stability (due to delocalization) that is significantly greater than that of a hypothetical localized structure (for example, Kekule structure). "Aromatic hydrocarbons" or "aromatics" can refer to cyclically conjugated hydrocarbons having a single ring or multiple rings. A common method for determining aromaticity of a given hydrocarbon is the observation of diatropicity in its $^1$H NMR spectrum, for example the presence of chemical shifts in the range of from 7.2 to 7.3 ppm for benzene ring protons. As used herein, the term "aromatic products" includes C6-C8 aromatics, such as benzene, toluene, mixed xylenes (commonly referred to as BTX), or benzene, toluene, ethylbenzene and mixed xylenes (commonly referred to as BTEX), and any combination thereof. These aromatic products (referred to in combination or in the alternative as BTX/BTEX for convenience herein) have a premium chemical value.

The term "petrochemicals" or "petrochemical products" refers to chemical products derived from crude oil that are not used as fuels. Petrochemical products include olefins and aromatics that are used as a basic feedstock for producing chemicals and polymers. Typical olefinic petrochemical products include, but are not limited to, ethylene, propylene, butadiene, butylene-1, isobutylene, isoprene, cyclopentadiene and styrene. Typical aromatic petrochemical products include, but are not limited to, benzene, toluene, xylene, and ethyl benzene.

The term "cycle oil" is used herein to refer to a mixture of light cycle oil and heavy cycle oil. The term "light cycle oil" and its acronym "LCO" as used herein refers to the light cycle oil produced by FCC zones. The nominal boiling range for this stream is, for example, in the range of about 215-350, 216-350, 220-350, 215-343, 216-343, 220-343, 215-330, 216-330 or 220-330° C. LCO, directly from FCC separation or after hydrotreating, is conventionally used in diesel blends depending on the diesel specifications, or as a cutter to the fuel oil tanks for a reduction in the viscosity and sulfur contents. The term "heavy cycle oil" and its acronym "HCO" as used herein refer to the heavy cycle oil which is produced by fluid catalytic cracking zones. The nominal boiling range for this stream is, for example, in the range of about 330+, 343+ or 350+, for instance 330-530, 330-510, 343-530, 343-510, 350-530 or 350-510° C. HCO is conventionally used in an oil flushing system within the process. Additionally, HCO is conventionally used to partially vaporize debutanizer bottoms and for recycle as a circulating reflux to the main fractionator in the fluid catalytic cracking zone.

The term "coker gas oil" is used herein to refer to hydrocarbons boiling above an end point of the middle distillate range, for instance having an initial boiling point in the range of about 320-370° C., and an end boiling point in the range of about 510-565° C., which are derived from thermal cracking operations in a coker zone, for instance hydrocarbons having a nominal boiling range of about 320-565, 320-540, 320-510, 340-565, 340-540, 340-510, 370-565, 370-540, or 370-510° C. The term "light coker gas oil" is used herein to refer to coker gas oil in the light range, for instance having an end boiling point from about 375-425° C., for instance hydrocarbons having a nominal boiling range of about 320-425, 320-400, 320-375, 340-425, 340-375, 340-375, 370-425, 370-400, or 370-375° C. The term "heavy coker gas oil" is used herein to refer to coker gas oil in the heavy range, for instance having an initial boiling point from about 375-425° C., for instance hydrocarbons having a nominal boiling range of about 375-565, 375-540, 375-510, 400-565, 400-540, 400-510, 425-565, 425-540, or 425-510° C. The term "coker naphtha" is used herein to refer to hydrocarbons boiling in the naphtha range derived from thermal cracking operations in a coker zone. The term "coker middle distillates" is used herein to refer to hydrocarbons boiling in the middle distillate range derived from thermal cracking operations in a coker zone.

FIG. 1 schematically depicts a refinery process and system generally includes a crude complex 100, a series of refinery units or zones to treat certain fractions from the crude complex 100 and a reformer 300, for fuel production. In addition, the system can include an aromatics recovery complex 500 when a refinery objective includes petrochemical production. In a semi petrochemical complex, an aromatic recovery complex 500 is included, and reformate from reformer 300 is routed to the aromatic recovery complex and/or a fuel pool, depending upon the demand.

The crude complex 100 typically includes an atmospheric distillation zone ("ADU") 110, a saturated gas plant 130 and a vacuum distillation zone ("VDU") 140. Refinery units or zones within the system that treat fractions from the crude complex 100 include a mid-distillate/diesel hydrotreating (DHT) zone 150, and a vacuum gas oil treatment (VGOT) zone (with one option being hydrocracking, zone 160, and another option being fluid catalytic cracking, zone 170, referred to herein in certain arrangements as a zone 160/170). The system includes a naphtha hydrotreating (NHT) zone 120 producing hydrotreated naphtha 119. In certain embodiments, a light naphtha fraction 118 is separated, and stream 119 represents a heavy naphtha fraction. The DHT zone 150 produces a hydrotreated naphtha fraction 152 (sometimes referred to as wild naphtha), and a hydrotreated middle distillate fraction 154. The VGOT zone 160/170 operates as a vacuum gas oil hydrocracking ("VGOHCK") zone 160 or as a vacuum gas oil fluid catalytic cracking ("VGOFCC") zone 170. The VGOHCK zone 160 generally produces a naphtha fraction 162, a cracked middle distillates fraction 164, and an unconverted oil fraction 166. The VGOFCC zone 170 can be operated to produce at least a light olefin product 174, fluid catalytic cracking (FCC) naphtha or gasoline 172, and cycle oil 176, which can include both light cycle oil and heavy cycle oil. In addition, a vacuum residue treatment (VRT) zone 200 is also typically integrated, alone or in combination with other optional units herein for processing residue fractions. VRT zone 200 receives as feedstock all or a portion of a vacuum residue stream 142 from the VDU 140.

A feed 102 is separated into fractions in the crude complex 100, typically including the ADU 110, the saturated gas plant 130 and the VDU 140. The feed 102 can be crude oil, or the feed can be crude oil that has been subjected to hydrotreating (hydrotreated crude oil), solvent deasphalting (deasphalted oil) or coking, such as delayed coking (coker liquid and gas products). In certain arrangements the feed 102 can be condensates, and the VDU and downstream vacuum residue treatment operations may not be required. The feed 102 is separated into fractions in the ADU 110 as is known. For example, a stream 136 of C2-C4 hydrocarbons including ethane, propane and butanes are separated from the light ends, and LPG 112 is separated from the ADU 110 via the saturated gas plant 130. Optionally, other light products are routed to the saturated gas plant 130, shown in dashed lines as stream 134, such as light gases from refinery units within the integrated system, and sometimes light gases from outside of the battery limits. Sweet off-gases 132 from the saturated gas plant 130 are removed and recovered as is typically known, for instance to contribute to a fuel gas ("FG") system. Off-gases from the fluid catalytic cracking unit(s), after passing through an unsaturated gas plant, can be integrated with off-gases from the saturated gas plant 130 for common handling of the fuel gases.

Straight run naphtha 114 from the ADU 110 can be passed to the NHT unit 120. In addition, the straight run naphtha stream 114 can contain naphtha from other sources as described herein and sometimes referred to as wild naphtha, for instance, naphtha range hydrocarbons from one or more of the integrated distillate, gas oil and/or residue hydroprocessing units. For example in certain arrangements (not shown), hydrocracked distillates including naphtha range hydrocarbons are passed to the ADU 110. The NHT unit 120 produces hydrotreated naphtha. In the embodiments shown naphtha is separated into light naphtha 118 and heavy naphtha 119, although a single naphtha effluent stream can be obtained. In embodiments in which light naphtha 118 is separated, it can be routed to an isomerization unit 250, and all or a portion of heavy naphtha 119 can be routed to a reformer 300. The isomerization unit 250 is operable to receive and isomerize the light naphtha fraction 118 to produce isomerate 252, which can be used as a gasoline blending component. In certain arrangements in which petrochemical production is integrated, all or a portion of isomerate 252 can optionally be passed to an aromatizing zone (not shown), and all or a substantial portion of the aromatized products are subsequently passed to the aromatics recovery complex 500.

One or more middle distillate streams from the ADU 110 can be used as feed to a mid-distillate/diesel hydrotreating (DHT) zone 150. In the conventional scheme shown in FIG. 1, at least two different middle distillate cuts are processed. In one example using the arrangement shown in FIG. 1, a first atmospheric distillation middle distillate fraction 116 contains light kerosene range hydrocarbons and a second atmospheric distillation middle distillate fraction 122, sometimes referred to as a diesel fraction, contains heavy kerosene range hydrocarbons and medium and heavy AGO range hydrocarbons. In certain arrangements (not shown) the first atmospheric distillation middle distillate fraction 116 that can be subjected to a kerosene sweetening unit to produce kerosene fuel (for example, by mercaptan oxidation, a separate hydrotreating step or a combination thereof, not shown).

In certain arrangements, the second middle distillate fraction 122 and all or a portion of the first middle distillate fraction 116 can be processed in a mid-distillate/diesel hydrotreating (DHT) zone 150 to produce a hydrotreated middle distillate fraction 154. The hydrotreated middle distillate fraction 154 is typically recovered as diesel fuel or as a diesel fuel blending component, along with a hydrotreated naphtha fraction 152.

The atmospheric residue fraction 126 is further separated in the VDU 140, generally into the vacuum gas oil fraction 144 and the vacuum residue fraction 142. The vacuum gas oil 144 from the VDU 140 is routed to the vacuum gas oil treatment (VGOT) zone 160/170. The gas oil fractions from the VDU 140 can include one or more VGO fractions, such as a light vacuum gas oil stream and a heavy vacuum gas oil stream. The VGOT zone 160/170 operates as a vacuum gas oil hydrocracking ("VGOHCK") zone 160 or as a vacuum gas oil FCC ("VGOFCC") zone 170. When VGOT zone 160/170 operates as a VGOHCK zone 160, it produces a hydrocracked naphtha fraction 162, a cracked middle distillate range fraction 164, and an unconverted oil fraction 166. The cracked middle distillate fraction 164 can be recovered as diesel fuel or as a diesel fuel blending component. When VGOT zone 160/170 operates as a VGOFCC zone 170, it produces a light olefin product 174, FCC naphtha 172, and a cycle oil 176 which includes both light and heavy cycle oil. The VGOFCC zone 170 includes associated therewith a mixing zone, a separator and a catalyst-stripping zone. Off-gases from the VGOFCC zone 170 can be integrated with the fuel gas system, and all or a portion of such gases containing light olefins (a C2− stream and a C3+ stream) can be routed through an unsaturated gas plant.

Vacuum residue treatment (VRT) zone 200 can include a residue hydrotreating unit and hydrocracking unit, a residue hydrotreating unit and an FCC unit, or a delayed coker (coking zone). When the VRT zone 200 is or integrates a combination residue hydrotreating unit and hydrocracking unit, the VRT is operable to receive and treat the vacuum residue fraction 142. The combination residue hydrotreating unit and hydrocracking unit can be operated to produce at least hydrocracked naphtha 212; other products are also typically recovered, including distillates and heavy oil, which are shown collectively as 214 for convenience of exposition. When the VRT zone 200 is or integrates a combination residue hydrotreating unit and an FCC unit, the VRT is operable is operable to receive and treat the vacuum residue fraction 142. The combination residue hydrotreating unit and an FCC unit can be operated to produce at least hydrotreated FCC naphtha 222; other products are also typically recovered, including light olefins and cycle oils, which are shown collectively as 224 for convenience of exposition. In certain embodiments light olefins are also produced (not shown). When the VRT zone 200 is or integrates a coking zone, the coking zone is operable to receive and thermally crack the vacuum residue fraction 142. The coking zone can be operated to produce at least coker naphtha 232; other products are also typically recovered, including light gases, light coker gas oil, heavy coker gas oil, and coke, are shown collectively as 234 for convenience of exposition.

In certain arrangements, one or more alternative vacuum residue treatment units can be integrated, alone or in combination with one of the embodiments of a VRT zone 200 described herein. For example, one or more of a solvent deasphalting zone 350 or a gasification zone 370 can be integrated. In certain embodiments, a solvent deasphalting zone 350 and a VRT zone 200 are integrated in the system. In certain embodiments, a solvent deasphalting zone 350, a gasification zone 370 and a VRT zone 200 are integrated in the system. In certain embodiments, a solvent deasphalting zone 350 and a gasification zone 370 are integrated in the system, and a VRT zone 200 is not included.

In certain embodiments, a solvent deasphalting zone 350 is integrated to receive all or any portion of vacuum residue 142. In certain embodiments solvent deasphalting zone 350 is used in combination with a gasification zone 370 and/or a VRT zone 200. In certain arrangements a solvent deasphalting zone 350 receives as feedstock all or a portion of a vacuum residue stream 142 from the VDU 140. In certain arrangements a solvent deasphalting zone 350 receives as feedstock all or a portion of a vacuum residue stream 142 from the VDU 140, and a portion of the atmospheric residue stream 126 from the ADU 110. The solvent deasphalting zone 350 typically produces a deasphalted oil stream 352 and asphalt 354. The deasphalted oil stream 352 can be used as feed to the VGOT zone 160/170. In embodiments in which a gasification zone 370 is integrated, all or a portion of asphalt 354 can included as feed thereto.

In certain arrangements, a gasification zone 370 is integrated to receive all or any portion of vacuum residue 142, alone or in combination with solvent deasphalting zone 350 and/or a VRT zone 200. In certain embodiments in which solvent deasphalting zone 350 is also integrated, asphalt 354 can be used as all or part of the feed to a gasification zone. In certain embodiments in which a delayed coking zone is integrated (for example as the VRT zone 200 or a unit thereof), coke from stream 224 can be used as all or part of the feed to a gasification zone. Other heavy oil streams can also be routed to gasification zone 370 as described herein.

One or more of naphtha streams 119, 162, 172, 212, 222, and/or 232, are passed to the catalytic reforming zone 300, which operates as is known to improve its quality, that is, increase its octane number to produce a reformate stream 302. In certain embodiments, one or more of the of naphtha streams can be subjected to additional hydrodesulfurization and/or hydrodenitrogenation, for example, to reduce the content of sulfur and nitrogen to less than 0.5 ppmw of sulfur and less than 0.5 ppmw of nitrogen. In some arrangements reformate stream 302 includes C6+ aromatic hydrocarbons. In addition, a hydrogen rich gas stream 304 is produced, all or a portion of which can optionally be used to meet the hydrogen demand in other parts of the refinery.

A suitable catalytic reforming zone 300 can include systems based on commercially available technology. In certain arrangements, all, a substantial portion or a significant portion of the naphtha streams 119, 162, 172, 212, 222, and/or 232 (optionally subjected to additional hydrotreating) are passed to the catalytic reforming zone 300, and any remainder can be blended in a gasoline pool. Typically, within the catalytic reforming zone 300, reactor effluent, containing hot reformate and hydrogen, is cooled and passed to a separator for recovery of a hydrogen stream and a separator bottoms stream the hydrogen is split into a portion that is compressed and recycled within the reformer reactors, and an excess hydrogen stream 304. The separator bottoms stream is passed to a stabilizer column to produce a light end stream and a reformate stream. The light end stream can be recovered and combined with one or more other similar streams obtained in the refinery. The hydrogen stream 304 can be recovered and passed to other hydrogen users within the refinery. In certain conventional arrangements in which the refinery objective is fuel production, reformate 302 is typically used as a gasoline blending pool component. In certain arrangements in which petrochemical production is integrated in the refinery, reformate 302 can be used as a feedstock for an aromatic complex 500, and optionally a portion 302' of reformate 302 is used as a gasoline blending pool component.

In embodiment in which an aromatic complex 500 is integrated for petrochemical production, products, such as benzene, toluene and xylenes, are recovered as one or more stream(s) 506, 508, and 510. In addition, a gasoline pool stream 502 is discharged therefrom, which is generally an aromatic-lean portion of the aromatic complex feed; for instance, benzene content of gasoline pool stream 502 is typically less than or equal to about 1-3 V %. The aromatic complex also separates a heavier fraction of C9+ aromatics, shown as stream 504, which is generally not suitable as a gasoline blending component stream as recovered.

Figure 2:
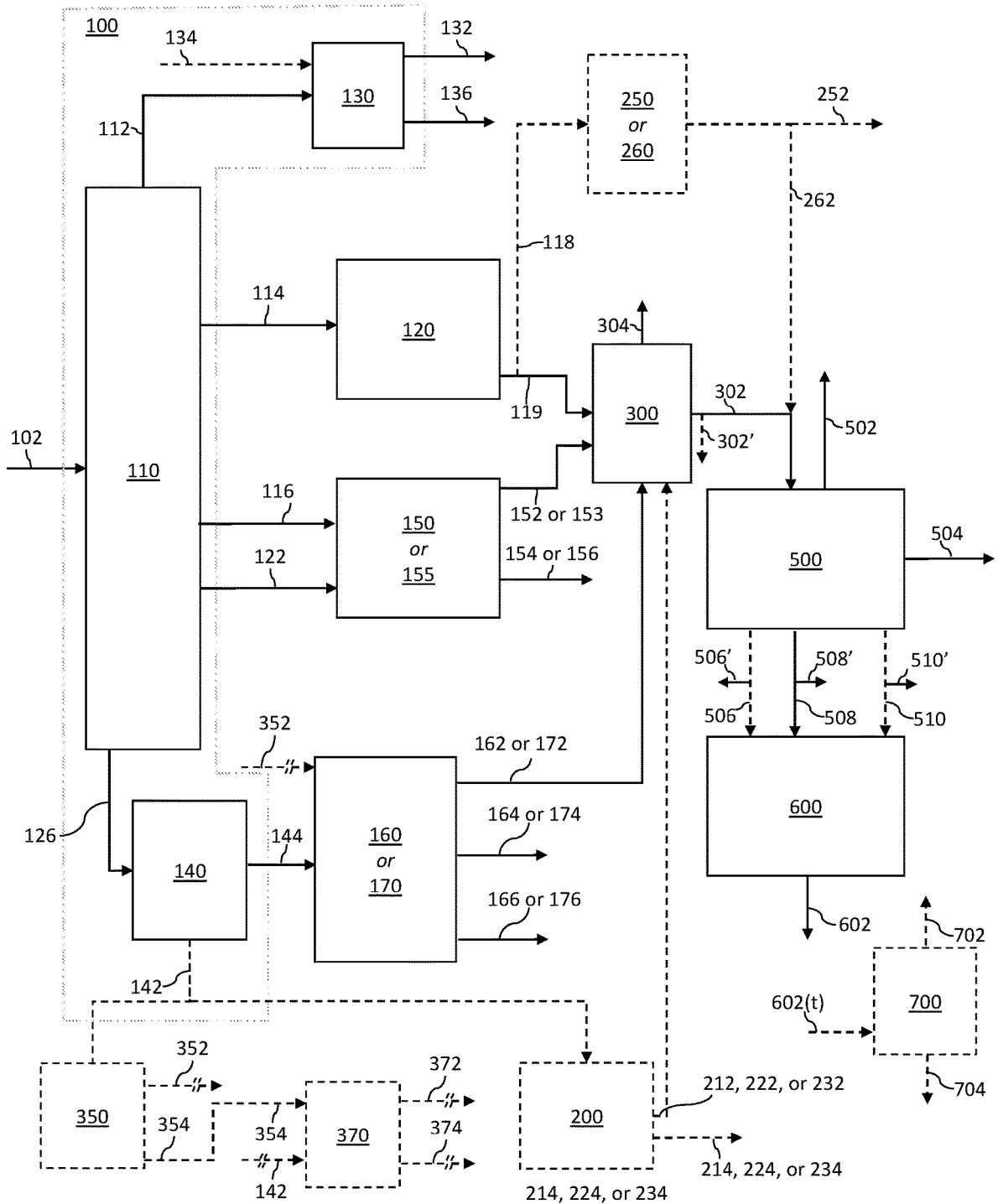
FIG. 2 is a simplified schematic diagram of an integrated fuel, petrochemical and hydrogen carrier refinery complex.

FIG. 2 schematically depict embodiments of a refinery process and system integrating production of aromatics and cyclohexanes. In certain embodiments one or more of the unit operations described with respect to FIG. 1 modified to operate under conditions and/or using catalysts that maximize the yield of heavy naphtha as feed to a reformer. In the description of the embodiment of FIG. 2, the same or similar units and streams from FIG. 1 are referred to by the same number. It is to be appreciated that the arrangement of the units can be varied as is known in the art, and that these are shown in context of producing unconventional feeds for petrochemical production. For example, products from refineries that may typically be used for producing diesel fuel and other fuel products having nominal boiling points in the middle distillate range are conditioned according to the disclosure herein to convert them into feedstocks that are effective for petrochemical production by catalytic reforming, aromatic recovery and hydrogenation to produce liquid effluent rich in cyclohexane compounds useful as hydrogen carriers, for instance including cyclohexane, methyl cyclohexane and/or dimethyl cyclohexane compounds.

In certain embodiments, a first middle distillate fraction 116, such as a kerosene fraction or a light kerosene fraction, and a second middle distillate fraction 122 can be processed in a DHT zone 150 to produce as a primary product a hydrocracked middle distillate fraction 154 and as a secondary product a hydrotreated naphtha fraction 152 as a minor component (for example, in the range of about 1-5 wt % of the total DHT zone liquid effluent). In embodiments in which a zone DHT 150 is used, all, a substantial portion, a significant portion or a major portion of the hydrotreated naphtha fraction 152 is used as feed to the catalytic reforming zone 300.

In certain embodiments, a first middle distillate fraction 116, such as a kerosene fraction or a light kerosene fraction, and a second middle distillate fraction 122 can be processed in a mid-distillate/diesel hydrocracking (MDHCK) zone 155 to produce a hydrocracked naphtha fraction 153 and a hydrocracked middle distillate fraction 156. In this way, by cracking at more severe conditions than a distillate hydrotreater as in a conventional processing scheme, the production of naphtha in the integrated process is optimized. For example, naphtha conversion of middle distillates in the MDHCK zone 155 can be in the range of about 5-99 wt % naphtha relative to the total MDHCK zone liquid effluent. In embodiments in which a MDHCK zone 155 is used, all, a substantial portion, a significant portion or a major portion of the hydrocracked naphtha fraction 153 is used as feed to the catalytic reforming zone 300.

In certain embodiments, VGO is hydrocracked 160 and hydrocracked naphtha 162 is one of the products recovered (for example, in the range of about 10-80 wt % naphtha relative to the total VGOHCK zone liquid effluent). In certain embodiments, all, a substantial portion, a significant portion or a major portion of the hydrocracked naphtha 162 is used as feed to the catalytic reforming zone 300. In certain embodiments, all, a substantial portion, a significant portion or a major portion of the hydrocracked naphtha 162 is subjected to an additional hydrotreating step, and the resulting hydrotreated naphtha is used as feed to the catalytic reforming zone 300. In certain embodiments, all, a substantial portion, a significant portion or a major portion of the hydrocracked naphtha 162 is routed to NHT zone 120 for hydrotreating, increasing the yield of effluent naphtha 119 (and optionally 118), and the resulting hydrotreated naphtha (or heavy naphtha 119) is used as feed to the catalytic reforming zone 300.

In certain embodiments, VGO is subjected to FCC processing 170, and FCC naphtha 172 is one of the products recovered (for example, in the range of about 30.0-80.0 wt % naphtha relative to the total VGOFCC zone liquid effluent). In certain embodiments, all, a substantial portion, a significant portion or a major portion of the FCC naphtha 172 is used as feed to the catalytic reforming zone 300. In certain embodiments, all, a substantial portion, a significant portion or a major portion of the FCC naphtha 172 is subjected to an additional hydrotreating step, and the resulting hydrotreated naphtha is used as feed to the catalytic reforming zone 300. In certain embodiments, all, a substantial portion, a significant portion or a major portion of the FCC naphtha 172 is routed to NHT zone 120 for hydrotreating, increasing the yield of effluent naphtha 119 (and optionally 118), and the resulting hydrotreated naphtha (or heavy naphtha 119) is used as feed to the catalytic reforming zone 300.

In certain embodiments, VR is subjected to VR treatment 200, and one or more of hydrocracked naphtha 212 (for example, in the range of about 5.0-30.0 wt % naphtha relative to the total VR HCK zone liquid effluent), FCC naphtha 222 (for example, in the range of about 30.0 70.0 wt % naphtha relative to the total VR FCC zone liquid effluent) or coker naphtha 232 (for example, in the range of about 5.0-30.0 wt % naphtha relative to the total VR coking zone liquid effluent). In certain embodiments, all, a substantial portion, a significant portion or a major portion of the naphtha range stream(s) 212, 222, 232 is used as feed to the catalytic reforming zone 300. In certain embodiments, all, a substantial portion, a significant portion or a major portion of the naphtha range stream(s) 212, 222, 232 is subjected to an additional hydrotreating step, and the resulting hydrotreated naphtha is used as feed to the catalytic reforming zone 300. In certain embodiments, all, a substantial portion, a significant portion or a major portion of the naphtha range stream(s) 212, 222, 232 is routed to NHT zone 120 for hydrotreating, increasing the yield of effluent naphtha 119 (and optionally 118), and the resulting hydrotreated naphtha (or heavy naphtha 119) is used as feed to the catalytic reforming zone 300.

The catalytic reforming zone 300 operates as is known to improve its quality, that is, increase its octane number to produce a reformate stream 302. In addition, the hydrogen rich gas stream 304 is produced, all or a portion of which can optionally be used to meet the hydrogen demand in other parts of the refinery.

In some embodiments of the present disclosure, two or more naphtha streams from the refinery serve as feed to the catalytic reforming zone 300, directly or after being subjected for further hydrotreating. For example, feed to catalytic reforming can include naphtha from the NHT zone 120 (stream 119, or full range naphtha) can be provided along with one or more of the of naphtha streams from middle distillate processing (152 or 153), from VGO distillate processing (162 or 172) or from VR processing (212, 222 or 232), optionally subjected to additional hydrodesulfurization and/or hydrodenitrogenation, for example, to reduce the content of sulfur and nitrogen to less than 0.5 ppmw of sulfur and less than 0.5 ppmw of nitrogen. In certain embodiments one or more of the of naphtha streams from middle distillate processing (152 or 153), from VGO distillate processing (162 or 172) or from VR processing (212, 222 or 232) can be passed to the NHT 120, and effluent therefrom serves as feed for catalytic reforming. In certain embodiments one or more of the of naphtha streams from middle distillate processing (152 or 153), from VGO distillate processing (162 or 172) or from VR processing (212, 222 or 232) can be passed to the ADU 110, which is then directed to the NHT 120, and effluent therefrom serves as feed for catalytic reforming. In certain embodiments one or more of the of naphtha streams from middle distillate processing (152 or 153), from VGO distillate processing (162 or 172) or from VR processing (212, 222 or 232) can be subjected to additional treatment to remove olefins and/or diolefins; for example, if a bromine number (known as an indicator for mono-olefin content) is about 1 or less and a maleic anhydride value (known as an indicator of diolelfin content), about 4 or less, additional treatment is unnecessary, but above those levels, a separate diolefin saturation step and reaction zone can be included.

In certain embodiments, all or a portion of the light naphtha fraction 118 is sent to an aromatizing zone 260. Aromatizing zone 260 is operable to receive and convert light naphtha into an aromatic rich hydrocarbon stream 262 comprising at least benzene, toluene, xylene, and C9+ aromatic hydrocarbons. In certain embodiments, an isomerization zone 250 is integrated which is operable to receive and isomerize all or a portion of the light naphtha fraction 118 to produce isomerate 252, which can be used as a gasoline blending component.

In certain arrangements in which fuel and petrochemical production are integrated, an isomerization zone 250 is provided to receive a first portion of light naphtha to produce isomerate 252, and an aromatizing zone 260 is provided to receive a second portion of light naphtha to produce an aromatic rich hydrocarbon stream 262 that is passed to the aromatics recovery complex 500; in certain arrangements where both zones 250 and 260 are provided, all or a portion of isomerate 252 can be passed to the aromatizing step 260 to increase the feed to the aromatics recovery complex 500.

In the aromatic complex 500, a gasoline pool stream 502 is discharged. The aromatic complex produces a heavier fraction of C9+ aromatics, stream 504, which is not suitable as a gasoline blending component stream. In addition, aromatic products, such as benzene 506, toluene 508 and xylenes 510 are recovered.

In certain embodiments, all or a portion of toluene 508 produced in the aromatic complex 500 is passed to a hydrogenation unit 600. In some embodiments, all or a portion of benzene 506 produced in the aromatic complex 500 is passed to the hydrogenation unit 600. In some embodiments, all or a portion of xylenes 510 produced in the aromatic complex 500 is passed to the hydrogenation unit 600. Any remaining portions of benzene 506', toluene 508' and xylenes 510' are recovered as aromatic products. The hydrogenation unit 600 is operated under conditions and using catalysts effective to produce a hydrogenation effluent 602 comprising cyclohexanes.

In some embodiments, the hydrogenation effluent 602 is used and/or transported as a hydrogen carrier. For example, a dehydrogenation unit 700 is schematically shown, receiving as a feed a hydrogen carrier 602($t$), representing the hydrogenation effluent 602 that has been transported to another location having the dehydrogenation unit 700. The dehydrogenation unit 700 is operated as is known to recover hydrogen 702 and a liquid effluent 704 containing aromatics. The reactor of the dehydrogenation unit 700 can be a fixed-bed type reactor, or a reactor configured in the same matter as a continuous catalytic reforming unit. Suitable dehydrogenation catalysts include: those similar to reforming catalysts, including those with an active metal component selected from one or more of Pt, Re, Au, Pd, Ge, Ni, Ag, Sn, Ir or halides, deposited or otherwise incorporated on a support, such as amorphous or crystalline alumina, silica alumina, titania, zeolites, or combinations thereof; in certain embodiments, a dehydrogenation catalyst comprise Pt or Pt-alloy active metal components that are supported on alumina, silica or silica-alumina. In certain embodiments, dehydrogenation catalysts include Pt, Pd or both, deposited or otherwise incorporated on an alumina chloride support. In certain embodiments, dehydrogenation catalysts include Pt, Pd or both, deposited or otherwise incorporated on a zeolitic support. Dehydrogenation reactions can occur at a temperature in the range of about 400-550° C., at a hydrogen partial pressure of about 1-30 bar, and at a hydrogen to oil feed ratio (SLt/Lt) of up to about 500, in certain embodiments about 50-500. The liquid effluent 704 from dehydrogenation generally include aromatics corresponding to the cyclohexanes, with some minor amount of cracked effluents such as C1-C4 gases.

Figure 3:
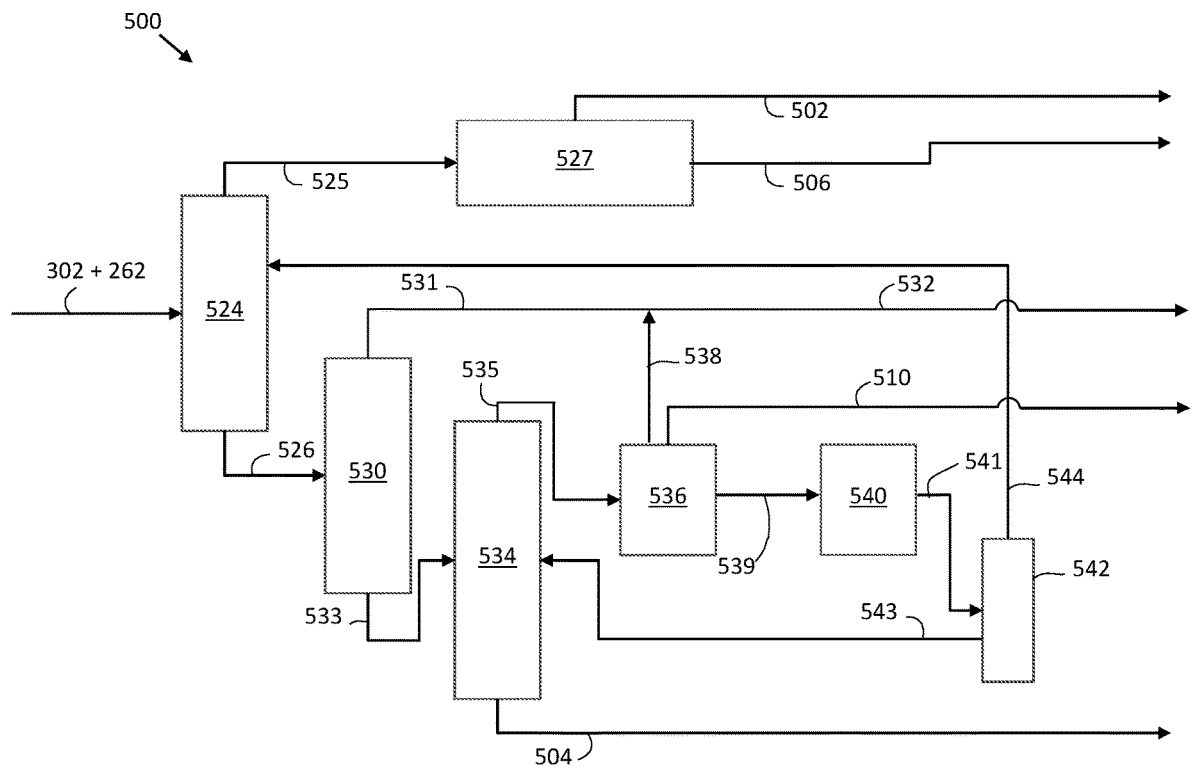
FIG. 3 is a simplified schematic diagram of an aromatic complex.

FIG. 3 is a schematic process flow diagram of an aromatic complex, such as the aromatic complex 500 as in FIG. 2. In the arrangement of FIGS. 2 and 3, reformate 302 and hydrocarbon stream 262 are passed to the aromatic complex 500 for separation of aromatic products, such as benzene and mixed xylenes, which have a premium chemical value, from one or more other gasoline blending component streams which are free of, or substantially free of, aromatics, and a heavier fraction of C9+ aromatics, stream 504, which is not suitable as a gasoline blending component stream. In some embodiments of the aromatic complex described in conjunction with FIG. 3, toluene along with C9+ hydrocarbon compounds can be subjected to transalkylation to produce ethylbenzene and mixed xylenes, as disclosed in U.S. Pat. No. 6,958,425, which is incorporated herein by reference.

The reformate and aromatic containing stream is divided into a light reformate stream 525 and a heavy reformate stream 526 in a reformate splitter 524. The light reformate stream 525, containing $C_5/C_6$ hydrocarbons, is sent to a benzene extraction unit 527 to extract a benzene product stream 506 and to recover a gasoline component stream 502 containing non-aromatic $C_5/C_6$ compounds, raffinate motor gasoline, in certain embodiments which is substantially free of benzene. The heavy reformate stream 526, containing $C_7$+ hydrocarbons, is routed to a heavy reformate splitter 530, to recover a $C_7$ component 531 that forms part of a $C_7$ gasoline product stream 532 that includes toluene as at least a major portion thereof, along with some other non-aromatic $C_7$ hydrocarbons, and a $C_8$+ hydrocarbon stream 533.

The $C_8$+ hydrocarbon stream 533 is routed to a xylene rerun unit 534, where it is separated into a $C_8$ hydrocarbon stream 535 and a heavier $C_9$+ aromatic hydrocarbon stream 504. The $C_8$ hydrocarbon stream 535 is routed to a para-xylene extraction unit 536 to recover a para-xylene product stream 510. Para-xylene extraction unit 536 also produces a $C_7$ cut mogas stream 538, which can be combined with $C_7$ cut mogas stream 531 to produce the $C_7$ cut mogas stream 532. A stream 539 of other xylenes (that is, ortho- and meta-xylenes) is recovered and sent to a xylene isomerization unit 540 to produce additional para-xylene, and an isomerization effluent stream 541 is sent to a splitter column 542. A $C_8$+ hydrocarbon stream 543 is recycled back to the para-xylene extraction unit 536 from the splitter column 542 via the xylene rerun unit 534. Splitter tops, $C_7$-hydrocarbon stream 544, is recycled back to the reformate splitter 524. In certain embodiments, the benzene 506, toluene 532 and para-xylene 510 together or separately are sent to hydrogenation unit 600 of FIG. 2. In certain embodiments, only toluene 532 is sent to hydrogenation unit 600 of FIG. 2. In certain embodiments, toluene 532 and one or both of benzene 506 and para-xylene 510 is sent to hydrogenation unit 600 of FIG. 2. In certain embodiments a portion of toluene 532 and optionally a portion of one or both of benzene 506 and para-xylene 510 is sent to hydrogenation unit 600 of FIG. 2.

Depending upon the target product slate, the aromatic separation can be designed and/or operated at full capacity or partial capacity. If benzene and p-xylene are the desired products, the aromatic separation can be designed to be operated at full capacity (that is, transalkylation of toluene is avoided). Benzene and p-xylene are recovered as chemical products and toluene is sent for hydrogenation to produce cyclohexanes. If the objective is to produce the most hydrogen carrier molecules possible, the aromatic recovery can be modified by excluding xylenes separation and isomerization, for instance whereby stream 535 including xylenes (para, ortho and meta) can be used as feed for the hydrogenation zone 600. In addition, all or a portion of benzene 506 is used as feed for the hydrogenation zone 600.

In certain embodiments, the determination of whether to operate the aromatic complex 500 at full capacity or partial capacity can depend on the desired product slate. For example, in modes of operation in which benzene and p-xylene production is favored, the aromatic complex 500 is operated at full capacity, and in modes of operation in which hydrogen carrier molecules production is favored, the aromatic complex 500 is operated at partial capacity, bypassing xylenes separation and isomerization. Accordingly, an operator can change the ratio of benzene and p-xylene to toluene based on the capacity of the aromatic complex 500.

Descriptions are provided below for exemplary units within the system and process herein, but it is to be appreciated that conditions and catalyst can vary, for example due to feedstock characteristics and processing objectives. Each of the processing units are operated at conditions typical for such units, with conditions which can be varied based on the type of feed to maximize, within the capability of the unit's design, the desired products. Desired products can include fractions suitable as feedstock to the petrochemicals production complex, or fractions suitable for use as fuel products. Likewise, processing units employ appropriate catalyst(s) depending upon the feed characteristics and the desired products. Certain embodiments of these operating conditions and catalysts are described herein, although it shall be appreciated that variations are well known in the art and are within the capabilities of those skilled in the art.

A NHT zone 120 is integrated to hydrotreat straight run naphtha and optionally one or more of the other naphtha streams in the refinery as described herein. For example, the NHT zone 120 can be operable for deep hydrodesulfurization and/or deep hydrodenitrogenation, for example, to reduce the content of sulfur and nitrogen to less than 0.5 ppmw of sulfur and less than 0.5 ppmw of nitrogen to maximize the efficacy of the reformer. In certain embodiments, a NHT zone 120 generally includes a reactor having one or more inlets in fluid communication with the feed and a source of hydrogen gas, and one or more outlets that discharge an effluent stream including liquid effluents. In certain embodiments the NHT zone 120 includes one or more high pressure and/or low pressure separation stages (not shown) for recovery and recycle of hydrogen and to produce liquid effluents. In certain embodiments, the NHT zone 120 can contain one or more fixed-bed, ebullated-bed, slurry-bed, moving bed, continuous stirred tank (CSTR), or tubular reactors, which can be in parallel arrangement, and operating conditions generally include: a reaction temperature (° C.) in the range of from about 250-400, 250-390, 250-380, 275-400, 275-390, 275-380, 300-400, 300-390, or 300-380; a hydrogen partial pressure (bar) in the range of from about 10-80, 10-60, 15-80, 15-60, 15-40, 20-80, 20-60, or 20-40; a hydrogen to oil feed ratio (SLt/Lt) up to about 500 or 300, in certain embodiments from about 100-500, 100-400, or 100-300; and a liquid hourly space velocity values ($h^{-1}$), on a fresh feed basis relative to the catalysts, in the range of from about 2-10, 2-9, 2-8, 3-10, 3-9, 3-8, 4-10, 4-9, or 4-8.

Suitable hydrotreating catalysts in the NHT zone 120 (sometimes referred to in the industry as "pretreat catalyst") contain one or more active metal component of metals or metal compounds (oxides or sulfides) selected from the Periodic Table of the Elements IUPAC Groups 6, 7, 8, 9 and One or more active metal component(s) are typically deposited or otherwise incorporated on a support, which can be amorphous and/or structured, such as alumina, silica alumina, silica, titania, titania-silica or titania-silicates. In certain embodiments, the active metal or metal compound is one or more of Co, Ni, W and Mo, including combinations such as one or more active metals or metal compounds selected from Co/Mo, Ni/Mo, Ni/W, and Co/Ni/Mo. Combinations of one or more of Co/Mo, Ni/Mo, Ni/W and Co/Ni/Mo, can also be used, for instance, in plural beds or separate reactors in series. The combinations can be composed of different particles containing a single active metal species, or particles containing multiple active species. In certain embodiments, the catalyst particles have a pore volume in the range of about (cc/gm) 0.15-1.70, 0.15-1.50, 0.30-1.50 or 0.30-1.70; a specific surface area in the range of about ($m^2/g$) 100-400, 100-350, 100-300, 150-400, 150-350, 150-300, 200-400, 200-350 or 200-300; and an average pore diameter of at least about 10, 50, 100, 200, 500 or 1000 angstrom units. The active metal(s) or metal compound(s) are incorporated in an effective concentration, for instance, in the range of (wt % based on the mass of the oxides, sulfides or metals relative to the total mass of the catalysts) 1-40, 1-30, 1-10, 1-5, 2-40, 2-30, 2-10, 3-40, 3-30 or 3-10.

In embodiments herein, a DHT zone 150 is integrated to hydrotreat the middle distillates typically with an objective of fuel production in the middle distillate range such as diesel, jet fuel and/or kerosene fuels, wherein hydrocracking to lower carbon number hydrocarbons is minimized. For example, with a starting feed in the middle distillate range, no more than about 1-5 wt % of the initial feed is converted to hydrocarbons below the middle distillate range, including in the range of naphtha and lighter. In certain embodiments, a DHT zone 150 generally includes a reactor having one or more inlets in fluid communication with the feed and a source of hydrogen gas, and one or more outlets that discharge an effluent stream including liquid effluents. In certain embodiments the DHT zone 150 includes one or more high pressure and/or low pressure separation stages (not shown) for recovery and recycle of hydrogen and to produce liquid effluents. In certain embodiments, the DHT zone 150 can contain one or more fixed-bed, ebullated-bed, slurry-bed, moving bed, CSTR, or tubular reactors, which can be in parallel arrangement, and operating conditions generally include: a reactor temperature (° C.) in the range of from about 270-430, 300-430, 320-430, 340-430, 270-420, 300-420, 320-420, 340-420, 270-400, 300-400, 320-400, 340-400, 270-380, 300-380, 320-380, 340-360, 270-360, 300-360, 320-360 or 340-360; a hydrogen partial pressure (bar) in the range of from about 30-60, 35-60 or 40-60; a hydrogen gas feed rate (SLt/Lt) of up to about 500, in certain embodiments from about 200-500, 250-500 or 300-500; and a liquid hourly space velocity ($h^{-1}$), on a fresh feed basis relative to the catalysts, in the range of from about 0.1-10.0, 0.1-6.0, 0.1-5.0, 0.1-4.0, 0.1-2.0, 0.5-10.0, 0.5-5.0, 0.5-2.0, 0.8-10.0, 0.8-6.0, 0.8-4.0, 0.8-2.0, 1.0-10.0, 1.0-6.0, 1.0-5.0, 1.0-4.0 or 1.0-2.0.

An effective quantity of hydrotreating catalyst is provided in the DHT zone 150, including those possessing hydrotreating functionality, including hydrodesulfurization and/or hydrodenitrification, to remove sulfur, nitrogen and other contaminants. Suitable hydrotreating catalysts (sometimes referred to in the industry as "pretreat catalyst") contain one or more active metal component(s) of metals or metal compounds (oxides or sulfides) selected from the Periodic Table of the Elements IUPAC Groups 6, 7, 8, 9 and 10. One or more active metal component(s) are typically deposited or otherwise incorporated on a non-acidic support, which can include alumina, silica alumina, silica, titania, titania-silica, titania-silicates or combinations including at least one of the foregoing support materials. In certain embodiments, the active metal or metal compound is one or more of Co, Ni and Mo, including combinations such as one or more active metals or metal compounds selected from Co/Mo, Ni/Mo, and Co/Ni/Mo. Combinations of one or more of Co/Mo, Ni/Mo, and Co/Ni/Mo can also be used, for instance, in plural beds or separate reactors in series. The combinations can be composed of different particles containing a single active metal species, or particles containing multiple active species. In certain embodiments, the catalyst particles have a pore volume in the range of about (cc/gm) 0.15-1.70, 0.15-1.50, 0.30-1.50 or 0.30-1.70; a specific surface area in the range of about (m$^2$/g) 100-400, 100-350, 100-300, 150-400, 150-350, 150-300, 200-400, 200-350 or 200-300; and an average pore diameter of at least about 10, 50, 100, 200, 500 or 1000 angstrom units. The active metal(s) or metal compound(s) are incorporated in an effective concentration, for instance, in the range of (wt % based on the mass of the oxides, sulfides or metals relative to the total mass of the catalysts) 1-40, 1-30, 1-10, 1-5, 2-40, 2-30, 2-10, 3-40, 3-30 or 3-10.

In embodiments herein, a MDHCK zone 155 is integrated to hydrocrack the middle distillates with an objective of increased naphtha production as compared to a DHT unit, wherein hydrocracking to lower carbon number hydrocarbons in the naphtha range is maximized. For example, with a starting feed in the middle distillate range, at least about 1.0-99.0 of the initial feed is converted to hydrocarbons below the middle distillate range, including in the range of naphtha and lighter. In certain embodiments at least about 5-99, 5-90, 10-99, 10-90, 20-99, 20-90, 5-80, 10-80 or 20-80 wt % of the initial feed is converted to hydrocarbons in the naphtha range. In certain embodiments, a MDHCK zone 155 generally includes a reactor having one or more inlets in fluid communication with the feed and a source of hydrogen gas, and one or more outlets that discharge an effluent stream including liquid effluents. In certain embodiments the MDHCK zone 155 includes one or more high pressure and/or low pressure separation stages (not shown) for recovery and recycle of hydrogen and to produce liquid effluents. In certain embodiments, the MDHCK zone 155 can contain one or more fixed-bed, ebullated-bed, slurry-bed, moving bed, CSTR, or tubular reactors, which can be in parallel arrangement, and operating conditions include:

a reaction temperature (° C.) in the range of from about 270-420, 270-410, 270-400, 300-420, 300-410, 300-400, 325-420, 325-410, 325-400, 350-420, 350-410, or 350-400; a hydrogen partial pressure (bar) in the range of from about 60-150, 60-110 or 60-80; a hydrogen to oil feed ratio (SLt/Lt) up to about 1000 or 750, in certain embodiments from about 500-1000, 500-900, or 500-750; and a weight hourly space velocity values (h$^{-1}$), in the range of from about 1-4, 1-3, 2-4, or 2-3.

In certain embodiments, the MDHCK zone 155 includes a separate pre-treat reactor containing suitable catalysts and operating under suitable conditions to carry out hydrodesulfurization and/or hydrodenitrification reactions. In certain embodiments, the MDHCK zone 155 includes a separate pre-treat reaction zone within the same reactor in which hydrocracking reactions are carried out, wherein the pre-treat reaction zone contains suitable catalysts to carry out hydrodesulfurization and/or hydrodenitrification reactions.

An effective quantity of hydrocracking catalyst is provided in the MDHCK zone 155, including those possessing hydrocracking functionality. In certain embodiments, the hydrocracking catalysts also include hydrodesulfurization and/or hydrodenitrification functionality to remove sulfur, nitrogen and other contaminants. In certain embodiments as noted herein hydrodesulfurization and/or hydrodenitrification is carried out in a separate reactor or reaction zone. Effective hydrocracking catalyst in the MDHCK zone 155 generally contain about wt % based on the weight of the catalyst, of one or more active metal component of metals or metal compounds (oxides or sulfides) selected from the Periodic Table of the Elements IUPAC Groups 6, 7, 8, 9 and 10. In certain embodiments, the active metal component is one or more of Mo, W or Ni. The active metal component is deposited or otherwise incorporated on an acidic support effective for cracking operations including acidic amorphous silica alumina, zeolites, or a support formed of both amorphous silica alumina and zeolites. In certain embodiments another support material can be included, for example an inorganic oxide binder material, such as acidic alumina, acidic amorphous silica alumina or acidic titania. In certain embodiments the support comprises an acidic amorphous inorganic oxide binder and zeolite, containing about 0.1-20, 0.1-0.1-10, 0.1-5, 1-20, 1-15 or 1-10 wt % (relative to the total catalyst particle mass) of zeolite. Effective commercial zeolites effective for hydrocracking include for instance ZSM-5, ZSM-11, ZSM-12, ZSM-22, ZSM-23, ZSM 35, and zeolites of type beta and Y. In certain embodiments suitable hydrocracking catalysts include USY zeolite. In certain embodiments suitable hydrocracking catalysts include USY zeolite that is prepared in accordance with U.S. Pat. Nos. 9,221,036B2 and 10,081,009B2, which are incorporated herein by reference in their entireties, as a modified USY zeolite support having one or more of Ti, Zr and/or Hf substituting the aluminum atoms constituting the zeolite framework thereof. In certain embodiments a catalyst effective for hydrocracking middle distillates includes active metal component(s) carried on a support containing an ultra-stable Y-type zeolite, wherein the above ultra-stable Y-type zeolite is a framework-substituted zeolite (referred to as a framework-substituted zeolite) in which a part of aluminum atoms constituting a zeolite framework thereof is substituted with 0.1-5 mass % zirconium atoms and 0.1-5 mass % Ti ions calculated on an oxide basis. In certain embodiments, active components carried on any of the above supports comprise 15-25 or 18-22 wt % Co and 2-8 or 4-6 wt % Ni.

In embodiments herein, a VGOHCK zone 160 is integrated to hydrocrack vacuum gas oil and optionally one or more other feeds such as deasphalted oil, with an objective of conversion to naphtha and middle distillates. The VGOHCK zone 160 can operate under conditions and using catalysts effective for mild (e.g., 27-52, 27-48, 30-50 or 30-52 wt % conversion), partial (48-82, 50-80, 48-75, or 50-75 wt % conversion) or full (78-100, 78-99, 78-90, 78-85, 80-100, 80-99 or wt %) conversion (wherein the weight percentages are components in effluent boiling at or below the atmospheric residue end boiling point, such as 370° C., including LPG, and distillate product components (naphtha 162 and middle distillate range products 164). In embodiments herein, a VGOHCK zone 160 is operated using catalyst and under conditions to produce vacuum gas oil hydrocracking reactor liquid effluent comprising at least about 10-80 wt % of naphtha-range hydrocarbons. In certain embodiments the VGOHCK zone 160 includes one reactor or two reactors a series configuration or in a two-stage configuration as described herein, and a fractionating zone, wherein the catalyst and conditions are effective to produce a vacuum gas oil hydrocracking reactor liquid effluent from the fractionating zone comprising at least about 10-80 wt % of naphtha-range hydrocarbons.

The reactor arrangement in the VGOHCK zone 160 operating can be a once-through single reactor hydrocracking system; a series-flow hydrocracking system with recycle to the first reactor zone, the second reactor zone, or both the first and second reactor zones; or a two-stage hydrocracking system with recycle. The individual reactors in the VGOHCK zone 160 can be one or more fixed-bed, ebullated-bed, slurry-bed, moving bed, CSTR, or tubular reactors, which can be in parallel arrangement, and is operated under conditions effective for vacuum gas oil hydrocracking, the particular type of reactor, the feed characteristics, the desired product slate and the catalyst selection.

In certain embodiments a once-through single reactor hydrocracking system is provided that operates in a mild hydrocracking mode of operation or a partial conversion mode of operation. In operation of a VGOHCK zone 160 configured as a once-through system, the feedstock and hydrogen are charged to the reaction zone. Hydrogen is provided in an effective quantity to support the requisite degree of hydrocracking, feed type, and other factors, and can be any combination including recycle hydrogen from optional gas separation subsystems associated with the reaction zones, derived from a fractionator gas stream, and/or make-up hydrogen. In certain embodiments, the reaction zones can contain multiple catalyst beds and can receive one or more quench hydrogen streams between the beds.

In certain embodiments, operating conditions for the reactor(s) in a VGOHCK zone 160 using a once-through (single stage without recycle) configuration and operating in a mild hydrocracking mode include: a reactor temperature (° C.) in the range of from about 300-450, 300-440, 300-420, 330-450, 330-440 or 330-420; a hydrogen partial pressure (bar) in the range of from about 15-100, 15-70, 15-60, 15-50, 20-100, 20-70, 20-60, 20-50, 30-100, 30-70, 30-60 or 30-50; a hydrogen gas feed rate (SLt/Lt) of up to about 2500, 2000 or 1500, in certain embodiments from about 800-2500, 800-2000, 800-1500, 1000-2500, 1000-2000 or 1000-1500; and a liquid hourly space velocity ($h^{-1}$), on a fresh feed basis relative to the catalysts, in the range of from about 0.1-0.1-6.0, 0.1-5.0, 0.1-4.0, 0.1-2.0, 0.3-10.0, 0.3-5.0, 0.3-2.0, 0.5-10.0, 0.5-6.0, 0.5-5.0, 0.5-4.0, 0.5-3.0 or 0.5-2.0.

In certain embodiments, operating conditions for the reactor(s) in a VGOHCK zone 160 using a once-through (single stage without recycle) configuration and operating in a partial conversion mode include: a reactor temperature (° C.) in the range of from about 300-500, 300-475, 300-450, 330-500, 330-475 or 330-450; a hydrogen partial pressure (bar) in the range of from about 50-120, 50-100, 50-90, 60-120, 60-100, 60-90, 70-120, 70-100 or 70-90; a hydrogen gas feed rate (SLt/Lt) of up to about 2500, 2000 or 1500, in certain embodiments from about 800-2500, 800-2000, 800-1500, 1000-2500, 1000-2000 or 1000-1500; and a liquid hourly space velocity ($h^{-1}$), on a fresh feed basis relative to the catalysts, in the range of from about 0.1-10.0, 0.1-5.0, 0.1-4.0, 0.1-2.0, 0.3-10.0, 0.3-5.0, 0.3-2.0, 0.5-10.0, 0.5-6.0, 0.5-5.0, 0.5-4.0, 0.5-3.0 or 0.5-2.0.

In certain embodiments, a VGOHCK zone 160 operates as a series-flow hydrocracking system with recycle to the first reactor zone, the second reactor zone, or both the first and second reactor zones. In general, a series flow hydrocracking zone includes a first reaction zone, a second reaction zone and a fractionating zone. The first reaction zone generally includes one or more inlets in fluid communication with the feed, a source of hydrogen gas, in certain embodiments a recycle stream comprising all or a portion of the fractionating zone bottoms stream (and optionally a portion of the fractionating zone products). One or more outlets of the first reaction zone that discharge an effluent stream is in fluid communication with one or more inlets of the second reaction zone. In certain embodiments, the effluents are passed to the second reaction zone without separation of any excess hydrogen and light gases. In optional embodiments, one or more high pressure and/or low pressure separation stages are provided between the first and second reaction zones for recovery of recycle hydrogen and to produce liquid intermediate effluents. The second reaction zone generally includes one or more inlets in fluid communication with one or more outlets of the first reaction zone, optionally a source of additional hydrogen gas, and in certain embodiments a recycle stream comprising all or a portion of the fractionating zone bottoms stream, and optionally a portion of the fractionating zone products. One or more outlets of the second reaction zone that discharge an effluent stream is in fluid communication with one or more inlets of the fractionating zone (optionally having one or more high pressure and/or low pressure separation stages in between the second reaction zone and the fractionating zone for recovery of recycle hydrogen and to produce liquid intermediate effluents).

In operation of a VGOHCK zone 160 configured as a series flow hydrocracking system with recycle, the feedstock and hydrogen are charged to the first reaction zone. The hydrogen is provided in an effective quantity to support the requisite degree of hydrocracking, feed type, and other factors, and can be any combination including recycle hydrogen from optional gas separation subsystems associated with one or both of the reaction zones, derived from the fractionator gas stream, and/or make-up hydrogen. In certain embodiments, one or both of the reaction zones can contain multiple catalyst beds and can receive one or more quench hydrogen streams between the beds. The first reaction zone operates under effective conditions for production of a reaction effluent stream which is passed to the second reaction zone (optionally after one or more high pressure and/or low pressure separation stages to recover recycle hydrogen and to produce liquid intermediate effluents), optionally along with an additional hydrogen stream. The second reaction zone operates under conditions effective for production of the second reaction effluent stream, which contains converted, partially converted and unconverted hydrocarbons. The second reaction effluent stream is passed to the fractionating zone, generally to recover gas and liquid products and by-products, and separate a bottoms fraction. In certain embodiments at least a portion of the fractionator bottoms stream from the reaction effluent is recycled to the first or second reaction zones. In certain embodiments, a portion of the fractionator bottoms from the reaction effluent is removed as bleed stream, which can be about 0-10, 1-10, 1-5 or 1-3 V % of the fractionator bottoms. For instance, a recycle stream to the first reaction zone can comprise about 0-100, 0-80, 1-100, 1-80 or 1-50 V % of the fractionator bottoms stream, and a recycle stream to the second reaction zone can comprise about 0-100, 0-80, 0-50, 1-100, 1-80 or 1-50 V % of the fractionator bottoms stream.

In certain embodiments, operating conditions for the first reactor(s) in a VGOHCK zone 160 using a once-through series configuration (with recycle) operating in a partial conversion mode of operation include: a reactor temperature (° C.) in the range of from about 300-450, 300-440, 300-420, 330-450, 330-440 or 330-420; a hydrogen partial pressure (bar) in the range of from about 50-150, 50-120, 50-100, 50-90, 60-150, 60-120, 60-100, 60-90, 60-80, 70-150, 70-120 or a hydrogen gas feed rate (SLt/Lt) of up to about 2500, 2000 or 1500, in certain embodiments from about 800-2500, 800-2000, 800-1500, 1000-2500, 1000-2000 or 1000-1500; and a liquid hourly space velocity ($h^{-1}$), on a fresh feed basis relative to the catalysts, in the range of from about 0.1-10.0, 0.1-6.0, 0.1-5.0, 0.1-4.0, 0.1-2.0, 0.3-10.0, 0.3-5.0, 0.3-2.0, 0.5-10.0, 0.5-6.0, 0.5-5.0, 0.5-4.0, 0.5-3.0 or 0.5-2.0. In certain embodiments, operating conditions for the second reactor(s) in a VGOHCK zone 160 using a once-through series configuration (with recycle) operating in a partial conversion mode of operation include: a reactor temperature (° C.) in the range of from about 300-450, 300-440, 300-420, 330-450, 330-440 or 330-420; a hydrogen partial pressure (bar) in the range of from about 50-150, 50-120, 50-100, 50-90, 60-150, 60-120, 60-100, 60-80, 70-150, 70-120 or 70-100; a hydrogen gas feed rate (SLt/Lt) of up to about 2500, 2000 or 1500, in certain embodiments from about 800-2500, 800-2000, 800-1500, 1000-2500, 1000-2000 or 1000-1500; and a liquid hourly space velocity ($h^{-1}$), on a fresh feed basis relative to the catalysts, in the range of from about 0.1-10.0, 0.1-6.0, 0.1-5.0, 0.1-4.0, 0.1-2.0, 0.3-10.0, 0.3-0.3-2.0, 0.5-10.0, 0.5-6.0, 0.5-5.0, 0.5-4.0, 0.5-3.0 or 0.5-2.0.

In certain embodiments, a VGOHCK zone 160 operates as a two-stage hydrocracking system with recycle, and typically includes a first reaction zone, a second reaction zone and a fractionating zone. One or more outlets of the first reaction zone that discharge an effluent stream is in fluid communication with one or more inlets of the fractionating zone (optionally having one or more high pressure and/or low pressure separation stages therebetween for recovery of recycle hydrogen and to produce liquid intermediate effluents. The fractionating zone bottoms outlet is in fluid communication with the one or more inlets of the second reaction zone for receiving a recycle stream, which is all or a portion of the bottoms stream. In certain optional embodiments, a portion of the bottoms stream is in fluid communication with one or more inlets of the first reaction zone. The second reaction zone generally includes one or more inlets in fluid communication with the fractionating zone bottoms outlet portion and a source of hydrogen gas. One or more outlets of the second reaction zone that discharge effluent stream are in fluid communication with one or more inlets of the fractionating zone (optionally having one or more high pressure and/or low pressure separation stages therebetween for recovery of recycle hydrogen and to produce liquid intermediate effluents).

In operation of a VGOHCK zone 160 configured as a two-stage hydrocracking system with recycle, the feedstock and hydrogen are charged to the first reaction zone. The hydrogen is provided in an effective quantity to support the requisite degree of hydrocracking, feed type, and other factors, and can be any combination including recycle hydrogen from optional gas separation subsystems associated with the reaction zones, derived from the fractionator gas stream, and/or make-up hydrogen, if necessary. In certain embodiments, a reaction zone can contain multiple catalyst beds and can receive one or more quench hydrogen streams between the beds. The first reaction zone operates under effective conditions for production of a reaction effluent stream which is passed to the fractionating zone (optionally after one or more high pressure and/or low pressure separation stages to recover recycle hydrogen and to produce liquid intermediate effluents) generally to recover gas and liquid products and by-products, and separate a bottoms fraction. In certain embodiments at least a portion of the fractionator bottoms stream from the reaction effluent is recycled to the first or second reaction zones. In certain embodiments, a portion of the fractionator bottoms from the reaction effluent is removed as bleed stream, which can be about 0-10, 1-10, 1-5 or 1-3 V % of the fractionator bottoms. In certain embodiments, all or a portion of the bottoms stream is recycled to the second reaction zone, the first reaction zone, or both the first and second reaction zones. For instance, a recycle stream to the first reaction zone can comprise about 0-100, 0-80, 0-50, 1-100, 1-80 or 1-50 V % of the fractionator bottoms stream, and a recycle stream to the second reaction zone can comprise about 0-100, 0-80, 0-50, 1-100, 1-80 or 1-50 V % of the fractionator bottoms stream. The second reaction zone operates under conditions effective for production of the reaction effluent stream, which contains converted, partially converted and unconverted hydrocarbons. The second stage reaction effluent is passed to the fractionating zone, optionally through one or more gas separators to recover recycle hydrogen and remove certain light gases.

In certain embodiments, operating conditions for the first stage reactor(s) in a VGOHCK zone 160 using a two-stage (with recycle) configuration operating in a full conversion mode of operation include: a reactor temperature (° C.) in the range of from about 300-450, 300-440, 300-420, 330-450, 330-440 or 330-420; a hydrogen partial pressure (bar) in the range of from about 60-150, 80-170, 80-150, 80-140, 80-130, 90-170, 90-150, 90-140, 90-130, 100-170, 100-150, 100-140, 100-130, 110-170, 110-150, 110-140, or 110-130; a hydrogen gas feed rate (SLt/Lt) of up to about 2500, 2000 or 1500, in certain embodiments from about 800-2500, 800-2000, 800-1500, 1000-2500, 1000-2000 or 1000-1500; and a liquid hourly space velocity ($h^{-1}$), on a fresh feed basis relative to the catalysts, in the range of from about 0.1-10.0, 0.1-6.0, 0.1-5.0, 0.1-4.0, 0.1-2.0, 0.3-10.0, 0.3-5.0, 0.3-2.0, 0.5-10.0, 0.5-6.0, 0.5-5.0, 0.5-4.0, 0.5-3.0 or 0.5-2.0. In certain embodiments, operating conditions for the second stage reactor(s) in a VGOHCK zone 160 using a two-stage (with recycle) configuration operating in a full conversion mode of operation include: a reactor temperature (° C.) in the range of from about 300-450, 300-440, 300-420, 330-450, 330-440 or 330-420; a hydrogen partial pressure (bar) in the range of from about 60-170, 60-150, 80-170, 80-150, 80-140, 80-130, 90-170, 90-150, 90-140, 90-130, 100-170, 100-150, 100-140, 100-130, 110-170, 110-150, 110-140, or 110-130; a hydrogen gas feed rate (SLt/Lt) of up to about 2500, 2000 or 1500, in certain embodiments from about 800-2500, 800-2000, 800-1500, 1000-2500, 1000-2000 or 1000-1500; and a liquid hourly space velocity ($h^{-1}$), on a fresh feed basis relative to the catalysts, in the range of from about 0.1-10.0, 0.1-6.0, 0.1-5.0, 0.1-4.0, 0.1-2.0, 0.3-10.0, 0.3-5.0, 0.3-2.0, 0.5-10.0, 0.5-6.0, 0.5-5.0, 0.5-4.0, 0.5-3.0 or 0.5-2.0.

Effective hydrocracking catalyst generally contain one or more active metal component(s) of metals or metal compounds (oxides or sulfides) selected from the Periodic Table of the Elements IUPAC Groups 6, 7, 8, 9 and 10. In certain embodiments, the active metal component(s) is/are one or more of Mo, W, Co or Ni. The active metal component(s) is/are typically deposited or otherwise incorporated on a support, such as amorphous alumina, amorphous silica alumina, zeolites, or combinations thereof. In certain embodiments, alone or in combination with the above metals, Pt group metals such as Pt and/or Pd, may be present as a hydrogenation component, generally in an amount of about 0.1-2 wt % based on the weight of the catalyst. For example, effective hydrocracking catalysts include one or more of an active metal component selected from the group consisting of Mo, W, Co or Ni (oxides or sulfides), incorporated on acidic alumina, silica alumina, zeolite or a combination thereof. In embodiments in which zeolites are used, they can be conventionally formed with one or more binder components such as alumina, silica, silica-alumina and mixtures thereof. In certain embodiments in which an objective is hydrodenitrification, the supports are acidic alumina, silica alumina or a combination thereof. In embodiments in which the objective is hydrodenitrification increases hydrocarbon conversion, the supports are silica alumina, or a combination thereof. Silica alumina is useful for difficult feedstocks for stability and enhanced cracking. In certain embodiments, the catalyst particles have a pore volume in the range of about (cc/gm) 0.15-1.70, 0.15-1.50, 0.30-1.50 or 0.30-1.70; a specific surface area in the range of about (m$^2$/g) 100-900, 100-500, 100-450, 180-900, 180-500, 180-450, 200-900, 200-500 or 200-450; and an average pore diameter of at least about 45, 50, 100, 200, 500 or 1000 angstrom units. The active metal component(s) are incorporated in an effective concentration, for instance, in the range of (wt % based on the mass of the oxides, sulfides or metals relative to the total mass of the catalysts) 1-40, 1-30, 1-10, 1-5, 2-40, 2-30, 2-10, 3-40, 3-30 or 3-10. In certain embodiments, the active metal component(s) include one or more of Mo, W, Co or Ni, and effective concentrations are based on all the mass of active metal components on an oxide basis. In certain embodiments, one or more beds are provided in series in a single reactor or in a series of reactors. For instance, a first catalyst bed containing active metals on silica alumina support is provided for hydrodenitrogenation, hydrodesulfurization and hydrocracking functionalities, followed by a catalyst bed containing active metals on zeolite support for hydrocracking functionality. Furthermore, depending on the level of conversion desired, the acidity of the catalyst is adjusted based on the zeolite levels. For example, when the desired product slate favors naphtha production, a strong acidity level is used by including about 30-80 wt % zeolite in the catalyst mixture.

In embodiments herein, a VGOFCC zone 170 is integrated to catalytically crack vacuum gas oil and optionally one or more other feeds such as deasphalted oil, with an objective of conversion to FCC naphtha and in certain embodiments olefins, with cycle oils as additional products. In embodiments in which VGO is processed in an FCC zone, the unit can be a riser configuration or a downflow configuration, as are known in the art. In certain embodiments, operating conditions for a suitable FCC unit 170 as a riser or downflow FCC unit include: a reaction temperature (° C.) of from about 480-550 or 500-550; a reaction pressure (bar) of from about 1-20, 1-10, or 1-3; a contact time (in the reactor, seconds) of from about 0.1-30, 0.5-30, 1-30, 10-30 or 15-30; and a catalyst-to-feed ratio of about 1:1 to 15:1, 1:1 to 10:1, 1:1 to 20:1, 8:1 to 20:1, 8:1 to 15:1, or 8:1 to 10:1. In certain embodiments the VGOFCC zone 170 includes a fractionating zone, wherein the catalyst and conditions are effective to produce FCC naphtha from the fractionating zone comprising at least about 30-80 or 60-80 wt % of naphtha-range hydrocarbons.

Effective FCC catalysts in arrangement in the VGOFCC zone 170 generally include zeolites, silica-alumina, carbon monoxide burning promoter additives, bottoms cracking additives, light olefin-producing additives and any other catalyst additives routinely used in the fluid catalytic cracking process. In certain embodiments, suitable cracking zeolites in the FCC process include zeolites Y, REY, USY and RE-USY. In certain embodiments, additives that promote naphtha cracking are avoided to maximize the naphtha range effluent from the VGOFCC zone 170.

Vacuum residue treatment (VRT) zone 200 can include a residue hydrotreating unit and hydrocracking unit, a residue hydrotreating unit and a FCC unit, or a delayed coker (coking zone). In some embodiments, the vacuum residue treatment (VRT) zone 200 can be operated in a non-conventional way to as to optimize naphtha production. For example, catalyst used can be catalysts containing more acidic zeolites and more zeolites in general. In some embodiments, the maximum amount of zeolite present in the catalyst matrix is 80 W %. Other acidic zeolites such as beta can also be added to the matrix.

In embodiments where vacuum residue treatment (VRT) zone 200 includes a residue hydrotreating unit and hydrocracking unit, the hydrotreating unit can be one or more fixed-bed, ebullated-bed, slurry-bed, moving bed, CSTR, or tubular reactors, which can be in parallel arrangement, operating conditions include: a reactor temperature (° C.) in the range of from about 370-450, 370-440, 370-430, 380-450, 380-440, 380-430, 390-450, 390-440 or 390-430; a hydrogen partial pressure (bar) in the range of from about 80-250, 80-200, 80-150, 90-250, 90-200, 90-150, 100-250, 100-200 or 100-150; a hydrogen gas feed rate (SLt/Lt) of up to about 3500, 3000 or 2500, in certain embodiments from about 1000-3500, 1000-3000, 1000-2500, 1500-3500, 1500-3000, 1500-2500, 2000-3500, 2000-3000 or 2000-2500; and a liquid hourly space velocity (h$^{-1}$), on a fresh feed basis relative to the catalysts, in the range of from about 0.1-4.0, 0.1-2.0, 0.1-1.5, 0.1-1.0, 0.2-4.0, 0.2-2.0, 0.2-1.5, 0.2-1.0, 0.5-4.0, 0.5-2.0, 0.5-1.5 or 0.5-2.0.

The hydrotreating unit can comprise a catalyst with hydrotreating functionality, for hydrodemetallization, hydrodesulfurization and hydrodenitrification. Such catalysts generally contain an effective amount, such as about 5-40 wt % based on the weight of the catalyst, of one or more active metal component(s) of metals or metal compounds (oxides or sulfides) selected from the Periodic Table of the Elements IUPAC Groups 6, 7, 8, 9 and 10. In certain embodiments, the active metal component(s) is/are one or more of Co, Ni, W and Mo. The active metal component(s) is/are typically deposited or otherwise incorporated on a support, such as amorphous alumina, amorphous silica alumina, zeolites, or combinations thereof. In certain embodiments, the catalyst used for hydrotreatment of the vacuum residue 142, prior to residue hydrocracking, includes one or more beds selected from Co/Mo, Ni/Mo, Ni/W, and Co/Ni/Mo. Combinations of one or more beds of Co/Mo, Ni/Mo, Ni/W and Co/Ni/Mo can also be used. The combinations can be composed of different particles containing a single active metal species, or particles containing multiple active species. In certain embodiments, a combination of Co/Mo catalyst and Ni/Mo catalyst are effective for hydrodemetallization, hydrodesulfurization and hydrodenitrification. One or more series of reactors can be provided, with different catalysts in the different reactors of each series.

The hydrotreated residue is then sent to a residue hydrocracker, which can be one or more fixed-bed, ebullated-bed, slurry-bed, moving bed, CSTR, or tubular reactors, which can be in parallel arrangement. For example, in one embodiment a vacuum residue hydrocracking reactor is an ebullated bed reactor. In the ebullated bed reactor liquid is recycled internally with a recycle downflow conduit. A reaction zone includes an ebullated-bed reactor and an associated ebullating pump. An ebullated-bed reactor includes an inlet for receiving a mixture of hydrogen gas and feedstock, and an outlet for discharging product effluent. The ebullating pump is in fluid communication with the ebullated-bed reactor and includes an inlet for receiving effluent recycled from the ebullated-bed reactor and an outlet for discharging the recycled effluent at an increased pressure. In the reaction zone, a mixture of hydrogen gas and feedstock is introduced into the ebullated-bed reactor for reaction that includes conversion of the feedstock into lower molecular weight hydrocarbons. Liquid reaction effluent continuously flows down in the downflow conduit located inside ebullated-bed reactor, and is recycled back to the ebullated-bed reactor at elevated pressure using the ebullating pump. Product effluent is recovered via a reactor outlet. Alternatively, the recycle liquid can be obtained from a vapor separator located downstream of the reactor or obtained from an atmospheric stripper bottoms stream. The recycling of liquid serves to ebullate and stabilize the catalyst bed, and maintain temperature uniformity through the reactor. In embodiments with an ebullated bed reactor for vacuum residue hydrocracking in the VRT zone 200, the catalyst is in an ebullated, or suspended state with random movement throughout the reactor vessel. A recirculating pump expands the catalytic bed and maintains the catalyst in suspension. The fluidized nature of the catalyst also permits on-line catalyst replacement of a small portion of the bed to produce a high net bed activity that remains relatively constant over time. In an ebullated bed reactor, highly contaminated feeds can be treated because of the continuous replacement of catalyst. In certain embodiments, a VRHCK unit of the VRT zone 200 includes a hydrocracking ebullated bed reactor operating under the following conditions: a reactor temperature (° C.) in the range of from about 370-450, 370-440, 370-430, 380-450, 380-440, 380-430, 390-450, 390-440 or 390-430; a hydrogen partial pressure (bar) in the range of from about 80-200, 80-150, 90-250, 90-200, 90-150, 100-250, 100-200 or 100-150; a hydrogen gas feed rate (SLt/Lt) of up to about 3500, 3000 or 2500, in certain embodiments from about 1000-3500, 1000-3000, 1000-2500, 1500-3500, 1500-3000, 1500-2500, 2000-3500, 2000-3000 or 2000-2500; a liquid hourly space velocity ($h^{-1}$), on a fresh feed basis relative to the hydrotreating catalysts, in the range of from about 0.1-4.0, 0.1-2.0, 0.1-1.5, 0.1-1.0, 0.2-4.0, 0.2-2.0, 0.2-1.5, 0.2-1.0, 0.5-4.0, 0.5-2.0, 0.5-1.5 or 0.5-2.0; and annualized relative catalyst consumption (RCC) rate in the range of about 1.0-3.0, 1.0-2.2, 1.0-2.0, 1.0-1.8, 1.0-1.4, 1.2-3.0, 1.2-2.2, 1.2-1.4, 1.4-3.0, 1.4-2.2, 1.4-1.8, 1.4-1.6, 1.6-1.8, 1.8-2.0, or 2.0-2.2. Effective hydrocracking catalyst for an ebullated bed reactor in a VRHCK unit of the VRC zone 200 include those possessing hydrotreating functionality. Such catalysts generally contain an effective amount, such as about 5-40 wt % based on the weight of the catalyst, of one or more active metal component(s) of metals or metal compounds (oxides or sulfides) selected from the Periodic Table of the Elements IUPAC Groups 6, 7, 8, 9 and 10. In certain embodiments, the active metal component(s) is/are one or more of Co, Ni, and Mo. The active metal component(s) is/are typically deposited or otherwise incorporated on a support, such as amorphous alumina, amorphous silica alumina, zeolites, or combinations thereof. One or more series of reactors can be provided, with different catalysts in the different reactors of each series. Under the above conditions and catalyst selections, exemplary products from an ebullated bed reactor in the VRT zone 200 include LPG in the range of 3-6 wt %, middle distillates in the range of about 25-40 wt %, naphtha in the range of about 5-40, 5-30, 10-30, 5-20 or 10-20 wt %, pitch in the range of about 10-20 wt %, and hydroprocessed gas oil in the range of about 20-30 wt %. In certain embodiments the VRT zone 200 includes one or more ebullated bed reactors and a fractionating zone, wherein the catalyst and conditions are effective to produce liquid effluent from the fractionating zone comprising at least about 5-40 or 5-30 wt % of naphtha-range hydrocarbons.

In embodiments with a slurry bed reactor for vacuum residue hydrocracking in the VRT zone 200, the catalyst particles have a very small average dimension that can be uniformly dispersed and maintained in the medium in order for efficient and immediate hydrogenation processes throughout the volume of the reactor. In general, in a slurry bed reactor, the catalyst is suspended in a liquid through which a gas is bubbled. The mechanism in a slurry bed reactor is a thermal cracking process and is based on free radical formation. The free radicals formed are stabilized with hydrogen in the presence of catalysts, thereby preventing the coke formation. In certain embodiments, a VRHCK unit of the VRT zone 200 includes a hydrocracking slurry bed reactor operating under the following conditions: a reactor temperature (° C.) in the range of from about 370-450, 370-440, 370-430, 380-450, 380-440, 380-430, 390-450, 390-440 or 390-430; a hydrogen partial pressure (bar) in the range of from about 80-250, 80-200, 80-150, 90-250, 90-200, 90-150, 100-250, 100-200 or 100-150; a hydrogen gas feed rate (SLt/Lt) of up to about 3500, 3000 or 2500, in certain embodiments from about 1000-3500, 1000-3000, 1000-2500, 1500-3500, 1500-3000, 1500-2500, 2000-3500, 2000-3000 or 2000-2500; a liquid hourly space velocity ($h^{-1}$), on a fresh feed basis relative to the hydrotreating catalysts, in the range of from about 0.1-4.0, 0.1-2.0, 0.1-1.5, 0.1-1.0, 0.2-4.0, 0.2-2.0, 0.2-1.5, 0.2-1.0, 0.5-4.0, 0.5-2.0, 0.5-1.5 or 0.5-2.0; and annualized relative catalyst consumption (RCC) rate in the range of about 1.0-3.0, 1.0-2.2, 1.0-2.0, 1.0-1.8, 1.0-1.4, 1.2-3.0, 1.2-2.2, 1.2-1.4, 1.4-3.0, 1.4-2.2, 1.4-1.8, 1.4-1.6, 1.6-1.8, 1.8-2.0, or 2.0-2.2. Effective hydrocracking catalyst for a slurry bed reactor in a VRHCK unit of the VRT zone 200 include those possessing hydrotreating and hydrogenation functionality. Such catalysts generally contain one or more active transition metal component of metals or metal compounds (oxides or sulfides) selected from the Periodic Table of the Elements IUPAC Groups 6, 7, 8, 9 and 10. In certain embodiments the active metal component(s) is/are unsupported. The catalyst is generally in the form of a sulfide of the metal that is formed during the reaction or in a pretreatment step. The metals that make up the dispersed catalysts can be selected from Mo, W, Ni, Co and/or Ru. Mo and W are especially preferred since their performance is superior to vanadium or iron, which in turn are preferred over Ni, Co or Ru. In certain embodiments the active metal component(s) is/are typically deposited or otherwise incorporated on a support, such as amorphous alumina, amorphous silica alumina, zeolites, or combinations thereof. The catalysts can be used at a low concentration, for example, a few hundred parts per million (ppm), in a once-through arrangement, but are not especially effective in upgrading of the heavier products under those conditions. To obtain better product quality, catalysts are used at higher concentration, and it is necessary to recycle the catalyst in order to make the process economically feasible. The catalysts can be recovered using methods such as settling, centrifugation or filtration. One or more series of reactors can be provided, with different catalysts in the different reactors of each series. Under the above conditions and catalyst selections, exemplary products from a slurry bed reactor in the VRT zone 200 include LPG in the range of 3-6 wt %, middle distillates in the range of about 23-55 wt %, naphtha in the range of about 5-40, 5-30, 5-20, 10-30 or 10-20 wt %, pitch in the range of about 10-20 wt %, and hydroprocessed gas oil in the range of about 15-30 wt %. In certain embodiments the VRT zone 200 includes one or more slurry bed reactors and a fractionating zone, wherein the catalyst and conditions are effective to produce liquid effluent from the fractionating zone comprising at least about 5-40 or 5-30 wt % of naphtha-range hydrocarbons.

In embodiments with a fixed bed reactor for vacuum residue hydrocracking in the VRT zone 200, catalyst particles are stationary and do not move with respect to a fixed reference frame. In conventional fixed-bed reactors, the hydroprocessing catalysts are replaced regularly in order to maintain the desired level of catalyst activity and throughput. In certain embodiments, a VRHCK unit of the VRC zone 1180 includes a hydrocracking fixed bed reactor operating under the following conditions: a reactor temperature (° C.) in the range of from about 370-470, 370-450, 380-470, 380-450, 390-470 or 390-450; a hydrogen partial pressure (bar) in the range of from about 80-250, 80-200, 80-150, 90-250, 90-200, 90-150, 100-250, 100-200 or 100-150; a hydrogen gas feed rate (SLt/Lt) of up to about 3500, 3000 or 2500, in certain embodiments from about 1000-3500, 1000-3000, 1000-2500, 1500-3500, 1500-3000, 1500-2500, 2000-3500, 2000-3000 or 2000-2500; and a liquid hourly space velocity (h$^{-1}$), on a fresh feed basis relative to the hydrotreating catalysts, in the range of from about 0.1-4.0, 0.1-2.0, 0.1-1.5, 0.1-1.0, 0.2-4.0, 0.2-2.0, 0.2-1.5, 0.2-1.0, 0.5-4.0, 0.5-2.0, 0.5-1.5 or 0.5-2.0. Effective hydrocracking catalyst for a fixed bed reactor in a VRHCK unit of the VRT zone 200 include those possessing hydrotreating functionality. Such catalysts generally contain an effective amount, such as about 5-40 wt % based on the weight of the catalyst, of one or more active metal component(s) of metals or metal compounds (oxides or sulfides) selected from the Periodic Table of the Elements IUPAC Groups 6, 7, 8, 9 and 10. In certain embodiments, the active metal component(s) is/are one or more of Co, Ni, and Mo. The active metal component(s) is/are typically deposited or otherwise incorporated on a support, such as amorphous alumina, amorphous silica alumina, zeolites, or combinations thereof. One or more series of reactors can be provided, with different catalysts in the different reactors of each series. Effective liquid hourly space velocity values (h$^{-1}$), on a fresh feed basis relative to the hydrotreating catalysts, are in the range of from about 0.1-0.5, 0.1-0.2, 0.2-0.3, 0.3-0.4, 0.4-0.5, 0.1-0.3 or 0.3-0.5. In certain embodiments the VRT zone 200 includes one or more fixed bed reactors and a fractionating zone, wherein the catalyst and conditions are effective to produce liquid effluent from the fractionating zone comprising at least about 1-20 or 5-20 wt % of naphtha-range hydrocarbons.

In embodiments with a moving bed reactor for vacuum residue hydrocracking in a VRHCK unit of the VRT zone 200, catalyst can be replaced without interrupting the unit's operation. Moving bed reactors combine certain advantages of fixed bed operations and the relatively easy catalyst replacement of ebullated bed technology. During catalyst replacement, catalyst movement is slow compared to the linear velocity of the feed. The frequency of catalyst replacement depends on the rate of catalyst deactivation. Catalyst addition and withdrawal are performed, for instance, via a sluice system at the top and bottom of the reactor. In certain embodiments, the moving bed reactor is operated in a counter current mode. In the counter current mode, spent catalyst already saturated by contaminates is located at the bottom of the reactor and meets the fresh feed entering from the bottom. This allows for fresh catalyst located at the top of the reactor to react with an already demetallized feed. In certain embodiments, a VRHCK unit of the VRT zone 200 includes a hydrocracking moving bed reactor operating under the conditions stated above for a fixed bed reactor. Catalyst material in a moving bed reactor is continuously replaced in an annualized relative catalyst consumption (RCC) rate in the range of about 0.4-0.8, 0.4-0.6, 0.6-0.8, 0.4-0.5, 0.5-0.6, 0.6-0.7 and 0.7-0.8. Under the above conditions and catalyst selections, exemplary products from a fixed bed reactor or moving bed reactor in the VRHCK unit include LPG in the range of 3-6 wt %, middle distillates in the range of about 5-30 wt %, naphtha in the range of about 1-40, 1-30, 1-20, 5-40, 5-30, 5-20, 10-30 or 10-20 wt %, pitch in the range of about 30-60 wt %, and hydroprocessed gas oil in the range of about 20-40 wt %. In certain embodiments the VRT zone 200 includes one or more moving bed reactors and a fractionating zone, wherein the catalyst and conditions are effective to produce liquid effluent from the fractionating zone comprising at least about 5-40 or 5-30 wt % of naphtha-range hydrocarbons.

As disclosed herein, a solvent deasphalting zone 350 can be integrated, alone or in combination with other optional units herein for processing residue fractions. Solvent deasphalting is a physical separation process wherein the components of the feed are recovered in their original state (without promotion of reactions to convert the feed). Typically, a paraffinic solvent with carbon number ranging 3-8 is used to separate the components in the heavy crude oil fractions. Solvent deasphalting is a flexible process typically utilized to separate atmospheric and vacuum heavy residues into two products, deasphalted oil ("DAO") and asphalt. The solvent composition, operating temperature and solvent-to-oil ratio are selected to achieve the desired split between the lighter DAO and heavy asphaltenes products. As the molecular weight of the solvent increases, so does the solubility of the charge. For example solvents most often used for production of lube oil bright stock are propane or a blend of propane and iso-butane. For applications where the DAO is sent to conversion processes such as fluid catalytic cracking, the solvent with higher carbon number such as butane or pentane, or mixtures thereof is selected. Typical uses for DAO include lube bright stock, lube hydrocracker feed, fuels hydrocracker feed, fluid catalytic cracker feed or fuel oil blending. Depending on the operation, the asphalt product may be suitable for use as a blending component for various grades of asphalt, as a fuel oil blending component, or as feedstock to a heavy oil conversion unit such as a coker or ebullated bed residue hydrocracker or gasification. Conventional solvent deasphalting is carried out with no catalyst or adsorbent. Commonly owned U.S. Pat. No. 7,566,394B2, entitled "Enhanced Solvent Deasphalting Process for Heavy Hydrocarbon Feedstocks Utilizing Solid Adsorbent," which is incorporated by reference herein in its entirety, employs solid adsorbents to increase the quality of DAO by separating poly-nuclear aromatics from DAO during the process. In embodiments in which adsorbent material is used to enhance deasphalting, similar to the process and system described in U.S. Pat. No. 7,566,394B2, adsorbent material is added to the feed or to a first separation zone, wherein a primary asphalt phase that forms all or part of the asphalt stream 354 contains the adsorbent material; in these embodiments all or a portion of the asphalt stream 354 can be passed to the gasification zone 370, in particular using membrane wall type gasifiers. In other embodiments, adsorbent material can be added to the DAO product after a second separation zone, and spent adsorbent material can be passed to the gasification zone 370 using membrane wall type gasifiers.

Two stage solvent deasphalting operations are well-known processes in which suitable solvent is used to precipitate asphaltenes from the feed. In general, in a solvent deasphalting zone, a feed is mixed with solvent so that the deasphalted oil is solubilized in the solvent. The insoluble pitch precipitates out of the mixed solution. Separation of the DAO phase (solvent-DAO mixture) and the asphalt/pitch phase typically occurs in one or more vessels or extractors designed to efficiently separate the two phases and minimize contaminant entrainment in the DAO phase. The DAO phase is then heated to conditions at which the solvent becomes supercritical. In typical solvent deasphalting processed, separation of the solvent and DAO is facilitated in a DAO separator. Any entrained solvent in the DAO phase and the pitch phase is stripped out, typically with a low pressure steam stripping apparatus. Recovered solvent is condensed and combined with solvent recovered under high pressure from the DAO separator. The solvent is then recycled back to be mixed with the feed. According to the process herein, steps associated with separation of the solvent and the DAO can be reduced or in certain embodiments eliminated.

Solvent deasphalting is typically carried-out in liquid phase thus the temperature and pressure are set accordingly. There are generally two stages for phase separation in solvent deasphalting. In a first separation stage, the temperature is maintained at a lower level than the temperature in the second stage to separate the bulk of the asphaltenes. The second stage temperature is carefully selected to control the final deasphalted oil quality and quantity. Excessive temperature levels will result in a decrease in deasphalted oil yield, but the deasphalted oil will be lighter, less viscous, and contain less metals, asphaltenes, sulfur, and nitrogen. Insufficient temperature levels have the opposite effect such that the deasphalted yield increases but the product quality is reduced. Operating conditions for solvent deasphalting units are generally based on a specific solvent and charge stock to produce a deasphalted oil of a specified yield and quality. Therefore, the extraction temperature is essentially fixed for a given solvent, and only small adjustments are typically made to maintain the deasphalted oil quality. The composition of the solvent is also an important process variable. Solvents used in typical solvent deasphalting processes include C3-C7 paraffinic hydrocarbons. The solubility of the solvent increases with increasing critical temperature, such that C3<iC4<nC4<iC5, that is, the solubility of iC5 is greater than that of nC4, which is greater than that of iC4, is greater than that of C3. An increase in critical temperature of the solvent increases the deasphalted oil yield. However, solvents having higher critical temperatures afford less selectivity resulting in lower deasphalted oil quality. Solvent deasphalting units are operated at pressures that are high enough to maintain the solvent in the liquid phase, and are generally fixed and vary with solvent composition. The volumetric ratio of the solvent to the solvent deasphalting unit charge is also important in its impact on selectivity, and to a lesser degree, on the deasphalted oil yield. The major effect of the solvent-to-oil ratio is that a higher ratio results in a higher quality of the deasphalted oil for a fixed deasphalted yield. A high solvent-to-oil ratio is preferred because of better selectivity, but increased operating costs conventionally dictate that ratios be limited to a relatively narrow range. Selection of the solvent is also a factor in establishing operational solvent-to-oil ratios. The necessary solvent-to-oil ratio decreases as the critical solvent temperature increases. The solvent-to-oil ratio is, therefore, a function of desired selectivity, operation costs and solvent selection.

The asphalt phase contains a majority of the process reject materials from the charge, for example metals, asphaltenes, Conradson carbon, and is also rich in aromatic compounds and asphaltenes. In addition to the solvent deasphalting operations described herein, other solvent deasphalting operations, although less common, are suitable. For instance, a three-product unit, in which resin, DAO and pitch can be recovered, can be used, where a range of bitumens can be manufactured from various resin/pitch blends.

The first phase separation zone includes one or more inlets in fluid communication with sources of feed and optionally adsorbent material. The first phase separation zone is in fluid communication with a source of solvent. The first phase separation zone includes, for example, one or more primary settler vessels suitable to accommodate the mixture of feed and solvent. In certain embodiments the first phase separation zone includes necessary components to operate at suitable temperature that maintained is sufficiently low to maximize recovery of the deasphalted oil from the feedstock and pressure conditions to promote solvent-flocculation of solid asphaltenes, such as below the critical temperature and pressure of the solvent, in certain embodiments between the boiling and critical temperature of the solvent, and below the critical pressure. The first phase separation zone also includes one or more outlets for discharging a primary asphalt phase (in certain embodiments also containing adsorbent material), and one or more outlets for discharging a primary deasphalted oil phase. In general, components with a higher degree of solubility in the non-polar solvent will pass with the primary deasphalted oil phase. In certain embodiments the outlet for discharging the primary asphalt phase is in fluid communication with a solvent-asphalt separation zone. In further embodiments the primary asphalt phase is in fluid communication with the gasification zone 370.

The second phase separation zone includes one or more inlets in fluid communication with the reduced asphalt content phase outlet from the first phase separation zone, and includes, for example, one or more secondary settler vessels suitable to accommodate the feed. In certain embodiments the second phase separation zone includes necessary components to operate at temperature and pressure conditions below that of the solvent. The second phase separation zone includes one or more outlets for discharging a secondary asphalt phase. An asphalt phase separates and forms at the bottom of the secondary settler that, due to increased temperature, is approaching the critical temperature of the solvent. In certain embodiments the outlet for discharging the secondary asphalt phase is in fluid communication with gasification zone 370, a solvent-asphalt separation zone, the first phase separation zone, or any combination thereof. The second phase separation zone also includes one or more outlets for discharging a reduced asphalt content phase stream, which is the secondary deasphalted oil phase. The rejected asphalt from the secondary settler contains a relatively small amount of solvent and deasphalted oil.

As shown in the figures, feed to the gasification zone 370 can include vacuum residue 142, and asphalt 354 (in those embodiments in which solvent deasphalting is integrated). Various other heavy material streams are produced in the integrated system including for example unconverted oil fractions (for example 166 or 176); heavy oils from VRT 200 such as heavy oil from 214, heavy cycle oil from 224, and/or heavy coker gas oil from 234; coke from 234; and/or C9+ aromatics stream 504 from ARC 500. All or any portion of these streams can be passed to a gasification zone 370, which can be any known gasification operation. In general, the gasification zone 370 produces raw synthesis gas stream 372 and steam 374, which can be used as-is or subjected to further processing as is known. For example, synthesis gas can be used as-is as a fuel gas for producing electricity, and/or as fuel gas for one or more furnaces in the integrated system and process, including for heating furnaces throughout the refinery, and steam can be used to produce electricity. Gasification is well known and is practiced worldwide with application to solid and heavy liquid fossil fuels, including refinery bottoms. The gasification process uses partial oxidation to convert carbonaceous materials, such as coal, petroleum, biofuel, or biomass with oxygen at high temperature, for instance, greater than 800° C., into synthesis gas 372 and steam 374. In certain embodiments synthesis gas can be subjected to a water-gas shift reaction represented by $CO+H2O \rightarrow CO2+H2$ to increase the total hydrogen produced. In certain embodiments, the integrated process and system herein includes preparing a flowable slurry of gasification feedstocks; introducing the slurry as a pressurized feedstock into a gasification reactor with a predetermined amount of oxygen and steam that is based on the carbon content of the feedstock; operating the gasification reactor at a temperature effective for partial oxidation to produce hydrogen, carbon monoxide and a slag material. In certain embodiments of the present integrated systems and processes using the gasification zone 370 a source of hydrogen is produced that can be routed to one or more of the hydroprocessing zones, including the hydrogenation zone 600.

Three principal types of gasifier technologies are moving bed, fluidized bed and entrained-flow systems. Each of the three types can be used with solid fuels, and the entrained-flow reactor has been demonstrated to process liquid fuels. In an entrained flow reactor, the fuel, oxygen and steam are injected at the top of the gasifier through a co-annular burner. The gasification usually takes place in a refractory-lined vessel which operates at a pressure of about 40 bars to 60 bars and a temperature in the range of from 1300° C. to 1700° C.

There are two types of gasifier wall construction: refractory and membrane. The gasifier conventionally uses refractory liners to protect the reactor vessel from corrosive slag, thermal cycling, and elevated temperatures that range from about 1400-1700° C. The refractory material is subjected to the penetration of corrosive components from the generation of the synthesis gas and slag and thus subsequent reactions in which the reactants undergo significant volume changes that result in degradation of the strength of the refractory materials. Typically, parallel refractory gasifier units are installed to provide the necessary continuous operating capability. Membrane wall gasifier technology uses a cooling screen protected by a layer of refractory material to provide a surface on which the molten slag solidifies and flows downwardly to the quench zone at the bottom of the reactor. In a membrane wall gasifier, the build-up of a layer of solidified mineral ash slag on the wall acts as an additional protective surface and insulator to minimize or reduce refractory degradation and heat losses through the wall. Thus the water-cooled reactor design avoids what is termed "hot wall" gasifier operation, which requires the construction of thick multiple-layers of expensive refractories which will remain subject to degradation. In the membrane wall reactor, the slag layer is renewed continuously with the deposit of solids on the relatively cool surface. Advantages of the refractory type reactor include short start-up/shut down times, and the capability of gasifying feedstocks with high ash content, thereby providing greater flexibility in treating a wider range of coals, petcoke, coal/petcoke blends, biomass co feed, and liquid feedstocks.

There are two principal types of membrane wall reactor designs that are adapted to process solid feedstocks. One such reactor uses vertical tubes in an up-flow process equipped with several burners for solid fuels, for example, coke from coking operations. A second solid feedstock reactor uses spiral tubes and down-flow processing for all fuels. For solid fuels, a single burner, for example having a thermal output of about 500 MWt, is suitable. In both of these reactors, the flow of pressurized cooling water in the tubes is controlled to cool the refractory and ensure the downward flow of the molten slag.

The gasification zone 370 can be any known gasification operation. In certain embodiments, a gasification system as disclosed in commonly owned U.S. Pat. Nos. 10,422,046B2, 9,234,146B2, 9,056,771B2 and/or 9,359,917B2, which are incorporated herein by reference, can be integrated. In one embodiment, an example of a gasification zone 1340 operates in a manner similar to that disclosed in commonly owned U.S. Pat. No. 8,721,927B2, which is incorporated by reference herein in its entirety. Such a gasification zone includes a gasification reactor in which a flowable slurry of one or more of the low-value material streams are partially oxidized to produce hydrogen and carbon monoxide as a hot raw synthesis gas, and slag. A gasification reactor, in certain embodiments a membrane wall gasification reactor, includes one or more inlets in fluid communication with a source of a flowable slurry of one or more of the low-value material streams from the process herein, a source of pressurized oxygen or an oxygen-containing gas, and a source of steam. The gasification reactor also includes one or more outlets for discharging slag, and one or more outlets for discharging hot raw synthesis gas. In certain embodiments hot raw synthesis gas is discharged for use in other downstream processes. A heat exchanger that can be used includes one or more inlets in fluid communication with the hot raw synthesis gas outlet, one or more outlets for discharging produced steam, and one or more outlets for discharging cooled synthesis gas. In certain embodiments, a portion of the cooled synthesis gas is discharged. In further embodiments, the cooled synthesis gas is conveyed to a water-gas shift reaction vessel including one or more inlets in fluid communication with cooled synthesis gas stream and a source of steam, and one or more outlets for discharging a shifted synthesis gas product containing hydrogen for use within the integrated system.

A flowable slurry is prepared including one or more low-value material streams produced in the asphaltene reduction operations herein. The flowable slurry is prepared, for example, fluidizing with nitrogen gas when the solvent deasphalting process bottoms are dry, that is, free of solvent and oil, or by diluting them with light or residual oils, such as cycle oils from fluid catalytic cracking or similar fractions, when the solvent deasphalting process bottoms are wet. The one or more low-value material streams and in certain embodiments diluent can be mixed in a mixing vessel with a stirrer or a circulation system before they are fed to the gasification reactor (not shown). For an entrained-flow gasification reactor, the slurry to the reactor can contain solid adsorbent material (wt %) in the range of from 2-50, 2-20 or 2-10. The slurry is introduced as a pressurized feedstock with a predetermined amount of oxygen or an oxygen-containing gas and steam into the gasification reactor. The feed is partially oxidized in the membrane wall gasification reactor to produce hydrogen, carbon monoxide and slag. The slag material, which is the final waste product resulting from the formation of ash, in certain embodiments from spent solid adsorbent material and its condensation on the water-cooled membrane walls of gasification reactor, are discharged and recovered for final disposal or for further uses, depending upon its quality and characteristics.

Hydrogen and carbon monoxide are discharged from the gasification reactor as hot raw synthesis gas. In certain embodiments all or any portion of the hot raw synthesis gas can optionally be withdrawn for use in other downstream processes. In certain embodiments, all or any portion of the hot raw synthesis gas can be passed to heat exchanger to cool the hot gas. Cooled synthesis gas is discharged. In certain embodiments all or any portion of the cooled synthesis gas is withdrawn for use in other downstream processes. Steam discharged from the heat exchanger can be withdrawn and/or be passed to turbine to produce electricity that is transmitted via electrical conductor. In certain embodiments, all or any portion of the cooled synthesis gas, and steam, are conveyed the water-gas shift reaction vessel. Carbon monoxide is converted to hydrogen in the presence of steam by the water-gas shift reaction represented by $CO+H_2O \rightarrow CO_2+H_2$. A mixture of hydrogen, carbon dioxide, unreacted carbon monoxide and other impurities is discharged as shifted synthesis gas. The increase in hydrogen content in the shifted synthesis gas is a function of the operating temperature and catalyst(s) used in the water-gas shift process. High purity hydrogen gas is optionally recovered by pressure swing absorption, membrane or liquid absorption, e.g., as described in commonly owned U.S. Pat. No. 6,740,226B2, which is incorporated by reference herein.

In certain embodiments, the isomerization zone 250 is integrated as is known to receive and isomerize all or a portion of the light naphtha fraction 118 to produce isomerate 252, which can be used as a gasoline blending component. The isomerization zone can contain one or more fixed-bed, ebullated-bed, slurry-bed, moving bed, CSTR, or tubular reactors, which can be in parallel arrangement, and operating conditions generally include a reaction temperature (° C.) in the range of from about 20-300, 20-285, 20-180, 50-300, 50-285, 50-180, 80-300, 80-285, 80-180, 100-300, 100-285 or 100-180. Lower reaction temperatures are generally preferred to favor equilibrium mixtures having the highest concentration of high-octane highly branched iso-alkanes and to minimize cracking of the feed to lighter hydrocarbons. In addition, the temperature range is also selected based on the type of catalyst. For instance, in embodiments in which zirconia type catalysts are used, the temperature should be from about 200-285° C. Hydrogen partial pressures in the isomerization zone 250 generally range from about 10-100, 10-70, 20-100, 20-70, 30-100 or 30-70 bar. In certain embodiments, for a pentane feedstock the hydrogen partial pressures is at least about 50 bar and for hexane and higher the reactor operating pressure is at least about 40 bar. Liquid hourly space velocities values ($h^{-1}$), on a fresh feed basis relative to the catalysts, are in the range of from about 0.2-20, 0.2-2, 1-20 or 1-2.

In catalytic reforming processes, paraffins and naphthenes are restructured to produce isomerized paraffins and aromatics of relatively higher octane numbers. Catalytic reforming converts low octane n-paraffins to i-paraffins and naphthenes. Naphthenes are converted to higher octane aromatics. The aromatics are left essentially unchanged, or some may be hydrogenated to form naphthenes due to reverse reactions taking place in the presence of hydrogen. The reactions involved in catalytic reforming are commonly grouped into the four categories of cracking, dehydrocyclization, dehydrogenation, and isomerization. A particular hydrocarbon/naphtha feed molecule may undergo more than one category of reaction and/or may form more than one product. There are several types of catalytic reforming process configurations which differ in the manner in which they regenerate the reforming catalyst to remove the coke formed in the reactors. Catalyst regeneration, which involves combusting detrimental coke in the presence of oxygen, includes a semi-regenerative process, cyclic regeneration, and continuous catalyst regeneration (CCR). Semi-regeneration is the simplest configuration, and the entire unit, including all reactors in the series, is shut-down for catalyst regeneration in all reactors. Cyclic configurations utilize an additional "swing" reactor to permit one reactor at a time to be taken off-line for regeneration while the others remain in service. Continuous catalyst regeneration configurations, which are the most complex, provide for essentially uninterrupted operation by catalyst removal, regeneration and replacement.

In general, operating conditions for reactor(s) in the catalytic reforming zone 300 include a temperature in the range of from about 400-560 or 450-560° C.; a pressure in the range of from about 1-50 or 1-20 bars; and a liquid hourly space velocity in the range of from about 0.5-10, 0.5-4, or 0.5-2 $h^{-1}$. The reformate is sent to the gasoline pool to be blended with other gasoline components to meet the required specifications. Cyclic and CCR process designs include online catalyst regeneration or replacement, and accordingly the lower pressure ranges as indicated above are suitable. For instance, CCRs can operate in the range of about 5 bar, while semi regenerative systems operate at the higher end of the above ranges, with cyclic designs typically operating at a pressure higher than CCRs and lower than semi regenerative systems.

An effective quantity of reforming catalyst is provided. Such catalysts include mono-functional or bi-functional reforming catalysts which generally contain one or more active metal component of metals or metal compounds (oxides or sulfides) selected from the Periodic Table of the Elements IUPAC Groups 8-10. A bi-functional catalyst has both metal sites and acidic sites. In certain embodiments, the active metal component can include one or more of Pt, Re, Au, Pd, Ge, Ni, Ag, Sn, Ir or halides. The active metal component is typically deposited or otherwise incorporated on a support, such as amorphous or crystalline alumina, silica alumina, titania, zeolites, or combinations thereof. In certain embodiments, Pt or Pt-alloy active metal components that are supported on alumina, silica or silica-alumina are effective as reforming catalyst. The hydrocarbon/naphtha feed composition, the impurities present therein, and the desired products will determine such process parameters as choice of catalyst(s), process type, and the like. Types of chemical reactions can be targeted by a selection of catalysts or operating conditions known to those of ordinary skill in the art to influence both the yield and selectivity of conversion of paraffinic and naphthenic hydrocarbon precursors to particular aromatic hydrocarbon structures.

In certain embodiments, the aromatizing zone 260 is integrated to form aromatics from non-aromatic including light naphtha 118. The aromatizing zone 260 can contain one or more fixed-bed, ebullated-bed, slurry-bed, moving bed, CSTR, or tubular reactors, which can be in parallel arrangement, and operating conditions include: a reaction temperature (° C.) in the range of from about 400-700, 450-650, 475-625, 500-600 or 525-575; a hydrogen partial pressure (bar) in the range of from about 1-30, 1-25, 1-20, 1-15, or 1-10; a hydrogen to oil feed ratio (SLt/Lt) up to about 500, in certain embodiments from about 50-500 or 100-500; and a weight hourly space velocity values (h$^{-1}$), in the range of from about 0.1-20, 0.25-15, 0.5-10, 0.75-5, 0.75-2, or 0.75-1.25.

The catalyst composition in the aromatizing zone 260 may be a catalyst described in commonly owned U.S. Application No. 2021/0187487, which is incorporated herein by reference, and may include a metal oxide dispersed on the surfaces of the zeolite support. The catalyst composition may include one or more oxides of a metal selected from the Periodic Table of the Elements IUPAC Groups 4-13, in certain embodiments Groups 8-13. In one or more embodiments, the metal of the one or more metal oxides may be a metal selected from Periodic Table of the Elements IUPAC Groups 4-13 and periods 4-6, in certain embodiments period 4. The metal of the metal oxide may include, but is not limited to, titanium, vanadium, chromium, manganese, iron, cobalt, nickel, copper, zinc, gallium, molybdenum, palladium, silver, hafnium, tungsten, platinum, gold, or combinations of these metals. In one or more embodiments, the metal of the one or more metal oxides may include gallium, zinc, iron, hafnium, or combinations of these metals. In one or more embodiments, the metal oxide may be gallium.

The metal oxide may be dispersed on the surfaces of the zeolite support. The surfaces of the zeolite support may include the outer surfaces of the zeolite support as well as the surfaces of the pores extending into the zeolite support. The catalyst composition may include an amount of the metal oxide dispersed on the on the surfaces of the zeolite support that is sufficient to cause at least a portion of the hydrocarbons to undergo a chemical reaction to form aromatic hydrocarbons. The catalyst composition may include from about 1-50 wt. % metal oxide, based on the total weight of the catalyst composition. For example, the catalyst composition may include from about 1-50, 1-45, 1-40, 1-35, 1-30, 1-25, 5-50, 10-50, 15-50, 20-50, 25-50, 5-25, or about 10-20 wt. % metal oxide based on the total weight of the catalyst composition.

The zeolite support may include faujasite (FAU) zeolites, mordenite framework inverted (MFI) zeolites, Beta (*BEA) zeolites, or combinations of these zeolite types. In one or more embodiments, the zeolite support includes an MFI type zeolite selected from ZSM-5, ZSM-11, ZSM-12, ZSM-22, ZSM-23, ZSM-35, ZSM-48, ZSM-50, or combinations of these MFI-type zeolites. In one or more embodiments, the zeolite support may be a ZSM-5 zeolite. The zeolite support may include any zeolitic material having an average pore size of less than 2.0 nanometers (nm), such as from about 0.30-2.0, 0.35-2.0, 0.40-2.0, 0.45-2.0, 0.50-2.0, 0.30-1.90, 0.30-1.80, 0.30-1.60, 0.30-1.50, 0.30-1.40, 0.30-1.30, 0.30-1.20, 0.30-1.10, 0.30-1.0, 0.30-0.90, 0.30-0.70, 0.35-0.70, 0.40-0.70, 0.45-0.65 or 0.50-0.60 nm. The zeolite support may include a molar ratio of silica to alumina (SAR) of from about 5-50 or any ratio between 5 and 50, for example about 5-50, 10-50, 15-50, 20-50, 25-50, 5-45, 5-40, 5-35, 10-45, 15-40, 20-35, or 25-35. In one or more embodiments, a suitable SAR is about 30.

The hydrogenation zone 600 is provided to receive a feed that contains at least a major portion, a significant portion or a substantial portion C6, C7, C6-C7, C7-C8 or C6-C8 aromatics, and convert such feed into a liquid effluent comprising effluent at least a major portion, a significant portion or a substantial portion of cyclohexanes. In certain embodiments, the hydrogenation zone 600 can contain one or more fixed-bed, ebullated-bed, slurry-bed, moving bed, CSTR, or tubular reactors, which can be in parallel arrangement, and operating conditions include: a reaction temperature (° C.) in the range of from about 250-320, 250-315, 250-310, 280-320, 280-315, 280-310, 285-320, 285-315, 285-310, 290-320, 290-315, or 290-310; a hydrogen partial pressure (bar) in the range of from about 20-100, 20-85, 20-70, 30-100, 30-85, 30-40, 40-100, 40-85 or 40-70; a hydrogen to oil feed ratio (SLt/Lt) up to about 3000, 2000 or 1500, in certain embodiments from about 500-3000, 500-2000, 500-1500, 1000-3000, 1000-2000 or 1000-1500; and a liquid hourly space velocity values (h$^{-1}$), on a fresh feed basis relative to the catalysts, in the range of from about 0.1-5.0, 0.1-3.0, 0.1-2.0, 0.5-5.0, 0.5-3.0, 0.5-2.0, 1.0-5.0, 1.0-5.0 or 1.0-2.0.

The hydrogen is provided in an effective quantity to carry out near complete hydrogenation of the aromatic feed, and can be from any combination of sources including recycle hydrogen from optional gas separation subsystems associated with a hydrogenation reaction zones, derived from the fractionator gas stream, and/or make-up hydrogen. In certain embodiments, a reaction zone can contain multiple catalyst beds and can receive one or more quench hydrogen streams between the beds.

An effective quantity of hydrogenation catalyst is provided in the hydrogenation zone 600 including those with one or more active metal components selected from Pt, Pd, Re and a combination comprising at least two of Pt, Pd or Re, and on a support containing zeolite. In certain embodiments, the one or more active metal components are provided in the range of (wt % based on the mass of the metal relative to the total mass of the catalyst) 0.01-5, 0.01-2, 0.05-5, 0.05-2, 0.1-5, 0.1-2, 0.5-5, or 0.5-2. In certain embodiments, the catalyst particles have a pore volume in the range of about (cc/gm) 0.15-1.70, 0.15-1.50, 0.30-1.50 or 0.30-1.70; a specific surface area in the range of about (m$^2$/g) 100-400, 100-350, 100-300, 150-400, 150-350, 150-300, 200-400, 200-350 or 200-300; and an average pore diameter of at least about 10, 50, 100, 200, 500 or 1000 angstrom units. The active metal component(s) is/are typically deposited or otherwise incorporated on a support such as amorphous alumina, and in certain embodiments non-acidic amorphous alumina. In certain embodiments the support comprises non-acidic amorphous alumina containing about 0.1-20, 0.1-15, 0.1-10, 0.1-5, 0.5-20, 0.5-15, 0.5-10, 0.5-5, 1-20, 1-15, 1-10, 2.5-20, 2.5-15, or 2.5-10 wt %, of zeolite, including USY zeolite. Non-acidic catalysts are selected for hydrogenation catalyst so as to favor hydrogenation reactions over hydrocracking reactions. Particularly effective hydrogenation catalyst to promote hydrogenation reactions to carry out near complete hydrogenation of the aromatic feed into cyclohexenes include noble metal active catalyst components on non-acidic supports, such as Pt, Pd or combinations thereof on non-acidic supports. In certain embodiments suitable hydrogenation catalysts includes a non-acidic support such as alumina having Pt as the active metal component in an amount of about 0.1-0.5 wt % based on the mass of the metal relative to the total mass of the catalyst, with relatively small amounts of zeolite such as USY zeolite, for instance 0.1-5 wt %. In certain embodiments, the USY zeolite is prepared in accordance with U.S. Pat. Nos. 9,221,036B2 and 10,081,009B2, which are incorporated herein by reference in their entireties, to produce a modified USY zeolite support having one or more of Ti, Zr and/or Hf substituting the aluminum atoms constituting the zeolite framework thereof. For instance, catalysts effective for hydrogenation include active metal component(s) carried on a support containing an ultra-stable Y-type zeolite, wherein the above ultra-stable Y-type zeolite is a framework-substituted zeolite (referred to as a framework-substituted zeolite) in which a part of aluminum atoms constituting a zeolite framework thereof is substituted with 0.1-5 mass % zirconium atoms and 0.1-5 mass % Ti ions calculated on an oxide basis.

In certain embodiments, the feedstock is selected as being aromatic rich, for instance at least about 75, 80, 90, 95, 98 or 99 wt % of aromatics, the total liquid product will have very high concentrations of cyclohexanes. In some embodiments, the aromatic content of the feed, and the catalyst and conditions of the hydrogenation unit 600, are effective to produce a hydrogenation effluent comprising at least about 95-99.9 wt % of cyclohexanes, including one or more of cyclohexane or substituted cyclohexanes such as methyl cyclohexane and dimethyl cyclohexane. In some embodiments, a negligible amount of gas formation occurs, which is handled as is known.

In some embodiments, individual unit operations can include a controller to monitor and adjust the product slate as desired. A controller can direct parameters within any of the individual unit operations of the apparatus depending upon the desired operating conditions, which may, for example, be based on customer demand and/or market value. A controller can adjust or regulate valves, feeders or pumps associated with one or more unit operations based upon one or more signals generated by operator data input and/or automatically retrieved data. Furthermore, the desired benzene, xylene and toluene content of the product slate can be a determining factor that is used to direct a controller to pass bypass xylenes separation and isomerization within the aromatics complex.

Such controllers provide a versatile unit having multiple modes of operation, which can respond to multiple inputs to increase the flexibility of the recovered product. The controller can be implemented using one or more computer systems which can be, for example, a general-purpose computer. Alternatively, the computer system can include specially-programmed, special-purpose hardware, for example, an application-specific integrated circuit (ASIC) or controllers intended for a particular unit operation within a refinery.

The computer system can include one or more processors typically connected to one or more memory devices, which can comprise, for example, any one or more of a disk drive memory, a flash memory device, a RAM memory device, or other device for storing data. The memory is typically used for storing programs and data during operation of the system. For example, the memory can be used for storing historical data relating to the parameters over a period of time, as well as operating data. Software, including programming code that implements embodiments of the invention, can be stored on a computer readable and/or writeable nonvolatile recording medium, and then typically copied into memory wherein it can then be executed by one or more processors. Such programming code can be written in any of a plurality of programming languages or combinations thereof.

Components of the computer system can be coupled by one or more interconnection mechanisms, which can include one or more busses, for instance, between components that are integrated within a same device, and/or a network, for instance, between components that reside on separate discrete devices. The interconnection mechanism typically enables communications, for instance, data and instructions, to be exchanged between components of the system.

The computer system can also include one or more input devices, for example, a keyboard, mouse, trackball, microphone, touch screen, and other man-machine interface devices as well as one or more output devices, for example, a printing device, display screen, or speaker. In addition, the computer system can contain one or more interfaces that can connect the computer system to a communication network, in addition or as an alternative to the network that can be formed by one or more of the components of the system.

According to one or more embodiments of the processes described herein, the one or more input devices can include sensors and/or flow meters for measuring any one or more parameters of the apparatus and/or unit operations thereof. Alternatively, one or more of the sensors, flow meters, pumps, or other components of the apparatus can be connected to a communication network that is operatively coupled to the computer system. Any one or more of the above can be coupled to another computer system or component to communicate with the computer system over one or more communication networks. Such a configuration permits any sensor or signal-generating device to be located at a significant distance from the computer system and/or allow any sensor to be located at a significant distance from any subsystem and/or the controller, while still providing data therebetween. Such communication mechanisms can be affected by utilizing any suitable technique including but not limited to those utilizing wired networks and/or wireless networks and protocols.

Although the computer system is described above by way of example as one type of computer system upon which various aspects of the processes herein can be practiced, it should be appreciated that the invention is not limited to being implemented in software, or on the computer system as exemplarily described. Indeed, rather than implemented on, for example, a general purpose computer system, the controller, or components or subsections thereof, can alternatively be implemented as a dedicated system or as a dedicated programmable logic controller (PLC) or in a distributed control system. Further, it should be appreciated that one or more features or aspects of the processes can be implemented in software, hardware or firmware, or any combination thereof. For example, one or more segments of an algorithm executable by a controller can be performed in separate computers, which in turn, can be in communication through one or more networks.

In some embodiments, one or more sensors and/or flow meters can be included at locations throughout the process, which are in communication with a manual operator or an automated control system to implement a suitable process modification in a programmable logic controlled process. In one embodiment, a process includes a controller which can be any suitably programmed or dedicated computer system, PLC, or distributed control system. The flow rates of certain product streams can be measured, and flow can be redirected as necessary to meet the requisite product slate.

Factors that can result in various adjustments or controls include customer demand of the various hydrocarbon products, market value of the various hydrocarbon products, feedstock properties such as API gravity or heteroatom content, and product quality (for instance, gasoline and middle distillate indicative properties such as octane number for gasoline and cetane number for middle distillates).

EXAMPLES

Example 1—Conventional refining—A crude oil was processed in a conventional refinery as shown in FIG. 1, without an aromatics recovery complex 500, to produce fuels. Table 1 show the fuels produced.

Example 2—Conventional refining and semi-petrochemical complex processing—A crude oil was processed in a refining and semi-petrochemical complex as shown in FIG. 1, including an aromatics recovery complex 500, to produce fuels and chemicals. Table 1 show the fuels and chemicals produced.

Example 3—Refinery producing hydrogen carrier and aromatic products—A crude oil was processed in a refining and semi-petrochemical complex as shown in FIG. 2 to produce fuels. In this example the mid-distillate are hydrotreated to produce diesel. In this example, the aromatics recovery complex 500 is operated at full capacity and only toluene is sent to the hydrogenation unit 600 to produce cyclohexanes. Hydrogenation unit 600 operated at conditions included a reactor temperature of 280° C., a hydrogen partial pressure of 60 bar, and a hydrogen gas feed rate of 3000 standard liters of hydrogen per liter of feed, over a Pt catalyst on a support containing zeolite and a binder material. Table 1 show the fuels and chemicals produced.

Example 4—Refinery producing hydrogen carrier—A crude oil was processed in a refining and semi-petrochemical complex as shown in FIG. 2 to produce fuels. In this example the mid-distillate are hydrocracked to produce naphtha (152) and diesel (156). Hydrocracking was carried out in the presence of a Pt catalyst on a support containing zeolite and a binder material. Hydrocracking conditions included a reactor temperature of 325° C., a hydrogen partial pressure of bar, a liquid hourly space velocity of 0.9 hours$^{-1}$, and a hydrogen gas feed rate of 1091 standard liters of hydrogen per liter of feed. The effluent contained 49 wt % naphtha, 49 wt % diesel 1.9% C1-C4 hydrocarbons. In this example, the aromatics recovery complex 500 is operated at partial capacity. BTX is sent to the hydrogenation unit 600 (operating at the same conditions in Example 3) to produce cyclohexanes. Table 1 show the fuels and chemicals produced.

and/or groups thereof. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all technical and scientific terms used herein have the same meaning as commonly understood by one of ordinary skill in the art to which this invention belongs. In case of conflict, the present specification, including definitions, will control. Although methods and materials similar or equivalent to those described herein can be used in the practice or testing of embodiments of the present invention, suitable methods and materials are described below. In addition, the materials, methods, and examples are illustrative only and not intended to be limiting.

When a value or parameter is given as either a range, preferred range or a list of upper preferable values and/or lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

TABLE 1

| Stream # | Stream name | Units | Example 1 | Example 2 | Example 3 | Example 4 |
|---|---|---|---|---|---|---|
| 102 | Crude Oil | KBPSD | 400.0 | 400.0 | 400.0 | 400.0 |
| 112 | LPG | KBPSD | 5.2 | 5.2 | 5.2 | 21.8 |
| As noted | Gasoline | KBPSD | 102.0 (252/302) | 71.4 (502) | 71.4 (502) | 71.4 (502) |
| 506 | Benzene | KTA | 0.0 | 222.0 | 222.0 | 0.0 |
| 508 | Toluene | KTA | 0.0 | 468.0 | 0.0 | 0.0 |
| 602 | Cyclohexane | KTA | 0.0 | 0.0 | 498.5 | 1633.5 |
| 510 | Para-xylene | KTA | 0.0 | 847.0 | 847.0 | 0.0 |
| As noted | Diesel | KBPSD | 265.0 (154) | 265.0 (154) | 265.0 (154) | 132.5 (156) |
| 142 | Vacuum Residue | KBPSD | 103.0 | 103.0 | 103.0 | 103.0 |

It is to be understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms ""including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An integrated refinery process comprising:
    catalytically reforming naphtha-range hydrocarbons to produce reformate containing C6-C8 aromatic hydrocarbons, wherein the naphtha-range hydrocarbons are obtained from a source within the refinery selected from the group consisting of
        a first naphtha source consisting of naphtha-range hydrocarbons derived from naphtha hydrotreating of straight run naphtha,
        a second naphtha source consisting of naphtha-range hydrocarbons derived from hydrocracking of straight run middle distillates,
        a third naphtha source consisting of naphtha-range hydrocarbons derived from treatment of vacuum gas oil by (a) hydrocracking of vacuum gas oil or (b) fluid catalytic cracking of vacuum gas oil,
        a fourth naphtha source consisting of naphtha-range hydrocarbons derived from treatment of vacuum residue by (a) residue hydrotreating of vacuum residue followed by hydrocracking of hydrotreated vacuum residue, (b) residue hydrotreating of vacuum residue followed by fluid catalytic cracking of hydrotreated vacuum residue, or (c) coking of vacuum residue,
        combinations comprising of two or more of the foregoing, and
        combinations comprising one or more of the foregoing and an additional deeply hydrotreated naphtha source; and
    reacting all or a portion of the reformate in the presence of a hydrogenation catalyst containing 0.01-5 wt % of one or more active metal components selected from Pt, Pd, Re and a combination comprising at least two of Pt, Pd or Re, on a catalyst support, at conditions including at a reactor temperature (° C.) in the range of from about 250-320, at a hydrogen partial pressure (bar) in the range of from about 40-100, at a hydrogen gas feed rate (standard liters per liter of hydrocarbon feed, SLt/Lt) of up to about 500-3000, and at a liquid hourly space velocity ($h^{-1}$), on a fresh feed basis relative to the hydrogenation catalysts, in the range of from about 0.1-5.0, the catalyst and conditions being effective to produce a liquid hydrogenation effluent hydrogen carrier in which at least about 95-99.9 wt % of C6-C8 aromatic hydrocarbons in the reformate are converted to cyclohexanes.

2. The process of claim 1, wherein all or a portion of the hydrogen carrier is transported and dehydrogenated to recover hydrogen.

3. The process of claim 1, wherein the first naphtha source is one or more of the sources of naphtha-range hydrocarbons for reforming, and wherein the naphtha hydrotreating occurs in the presence of a naphtha hydrotreating catalyst selected from catalyst that contain one or more active metal component of metals or metal compounds (oxides or sulfides) selected from the Periodic Table of the Elements IUPAC Groups 6, 7, 8, 9 and 10 and at conditions including a reactor temperature (° C.) in the range of from about 250-400, a hydrogen partial pressure (bar) in the range of from about 10-80, a hydrogen gas feed rate (SLt/Lt) of up to about 100-500, and a liquid hourly space velocity ($h^{-1}$), on a fresh feed basis relative to the naphtha hydrotreating catalyst, in the range of from about 2-10.

4. The process of claim 3, wherein effluents from naphtha hydrotreating of straight run naphtha comprise a heavy fraction of naphtha-range hydrocarbons that is one or more of the sources of naphtha-range hydrocarbons for reforming, and a light fraction of naphtha-range hydrocarbons, the process further comprising:
    aromatizing all or a portion of the light fraction of naphtha-range hydrocarbons to produce an aromatic hydrocarbon stream comprising at least C6 and C7 aromatic hydrocarbons, and
    combining all or a portion of the aromatic hydrocarbon stream from aromatizing with the reformate reacting in the presence of the hydrogenation catalyst.

5. The process as in claim 1, wherein the second naphtha source is one or more of naphtha-range hydrocarbons for reforming, and wherein the hydrocracking of straight run middle distillates occurs in the presence of distillate hydrocracking catalyst selected from catalyst that have one or more active metal component of metals or metal compounds (oxides or sulfides) selected from the Periodic Table of the Elements IUPAC Groups 6, 7, 8, 9 and 10 carried on a support comprising acidic inorganic oxide and 0.1-20 wt % (relative to the total catalyst particle mass) of zeolite, and at conditions including a reactor temperature (° C.) in the range of from about 270-420, a hydrogen partial pressure (bar) in the range of from about 40-150, a hydrogen gas feed rate (SLt/Lt) of up to about 300-1000, and a liquid hourly space velocity ($h^{-1}$), on a fresh feed basis relative to the distillate hydrocracking catalysts, in the range of from about 1-4, the catalyst and conditions being effective to produce a middle distillate hydrocracking reactor liquid effluent comprising at least about 20-90 wt % of naphtha-range hydrocarbons.

6. The process as in claim 1, wherein the third naphtha source is one or more of naphtha-range hydrocarbons for reforming, wherein treatment is hydrocracking, and wherein the hydrocracking of vacuum gas oil occurs in the presence of a VGO hydrocracking catalyst selected from catalyst that have one or more active metal component of metals or metal compounds (oxides or sulfides) selected from the Periodic Table of the Elements IUPAC Groups 6, 7, 8, 9 and 10, and at conditions including a reactor temperature (° C.) in the range of from about 300-450, a hydrogen partial pressure (bar) in the range of from about 60-150, a hydrogen gas feed rate (SLt/Lt) of up to about 800-2500, and a liquid hourly space velocity ($h^{-1}$), on a fresh feed basis relative to the distillate hydrocracking catalysts, in the range of from about 0.1-10, the catalyst and conditions being effective to produce a vacuum gas oil hydrocracking reactor liquid effluent comprising at least about 10-80 wt % of naphtha-range hydrocarbons.

7. The process as in claim 1, the third naphtha source is one or more of naphtha-range hydrocarbons for reforming, wherein treatment is fluid catalytic cracking, and wherein the fluid catalytic cracking of vacuum gas oil occurs in the presence of VGO FCC catalyst selected from zeolites Y, REY, USY, Beta and RE-USY, and at conditions including a reactor temperature (° C.) in the range of from about 480-550, a reaction pressure (bar) in the range of from about 1-20, a contact time (in the reactor, seconds) in the range of from about 0.1-30, and a catalyst-to-feed ratio (mass/mass) in the range of from about 1:1 to 10:1, the catalyst and conditions being effective to produce a vacuum gas oil fluid catalytic cracking reactor liquid effluent comprising at least about 30-80 wt % of naphtha-range hydrocarbons.

8. The process as in claim 1, wherein the fourth naphtha source is one or more of naphtha-range hydrocarbons for reforming, the catalyst and conditions being effective to produce a vacuum residue reactor effluent comprising at least about 5-40 wt % of naphtha-range hydrocarbons.

9. The process as in claim 1, wherein:
the reformate is processed and separated in an aromatic recovery complex by
separating the reformate into a first portion containing C6 aromatic hydrocarbons and a second portion containing C7-C8+ aromatic hydrocarbons,
separating the first portion of the reformate into benzene and non-aromatics,
separating the second portion of the reformate into toluene and a C8+ aromatic hydrocarbon fraction,
separating the C8+ aromatic hydrocarbon fraction into a C8 aromatic hydrocarbon fraction and a C9+ aromatic hydrocarbon fraction,
separating the C8 aromatic hydrocarbon fraction into para-xylene, and other C8 aromatic hydrocarbons, and
isomerizing the other C8 aromatic hydrocarbons to produce additional para-xylenes and C8+ hydrocarbons that are recycled to separation of the C8+ aromatic hydrocarbon fraction derived from the second portion of the reformate;
all or a portion of the toluene is the portion of the reformate that is reacted to produce hydrogen carrier; and
benzene and para-xylene are recovered as chemical products.

10. The process as in claim 1, wherein:
the reformate is processed and separated in an aromatic recovery complex by
separating the reformate into a first portion containing C6 aromatic hydrocarbons and a second portion containing C7-C8+ aromatic hydrocarbons,
separating the first portion of the reformate into benzene and non-aromatics,
separating the second portion of the reformate into toluene and a C8+ aromatic hydrocarbon fraction, and
separating the C8+ aromatic hydrocarbon fraction into a C8 aromatic hydrocarbon fraction and a C9+ aromatic hydrocarbon fraction;
all or a portion of the toluene and all or a portion of the C8 aromatic hydrocarbon fraction are portions of the reformate that are reacted to produce hydrogen carrier; and
benzene is recovered as a chemical product.

11. The process as in claim 10, wherein the C8 aromatic hydrocarbon fraction is not subjected from additional separation or reaction prior to reacting to produce hydrogen carrier.

12. The process as in claim 10, wherein, prior to separating the reformate into a first portion containing C6 aromatic hydrocarbons and a second portion containing C7-C8+ aromatic hydrocarbons, the reformate is separated an aromatic-rich fraction and an aromatic-lean fraction, and wherein the aromatic-rich fraction is separated into the first portion containing C6 aromatic hydrocarbons and the second portion containing C7-C8+ aromatic hydrocarbons.

13. The process as in claim 1, wherein the reformate is separated an aromatic-rich fraction and an aromatic-lean fraction, and all or a portion of the aromatic-rich fraction is reacted to produce hydrogen carrier, wherein the total initial reactants to produce hydrogen carrier contains at least about 90-99 wt % aromatic hydrocarbons.

14. The process as in claim 1, wherein the hydrogenation catalyst contains one or more active metal components selected from Pt, Pd, Re and a combination comprising at least two of Pt, Pd or Re, and wherein the catalyst support of the hydrogenation catalyst comprises zeolite at a concentration range of 0.1-20 wt % and non-acidic amorphous alumina.

15. An integrated refinery process comprising:
separating crude oil by atmospheric distillation into at least straight run naphtha, middle distillates, and atmospheric residue;
separating atmospheric residue by vacuum distillation into at least vacuum gas oil and vacuum residue;
hydrotreating the straight run naphtha to produce hydrotreated naphtha as a first naphtha source;
hydrocracking the middle distillates to produce at least naphtha-range hydrocarbons as a second naphtha source;
treating at least a portion of the vacuum gas oil to produce at least naphtha-range hydrocarbons as a third naphtha source, wherein treating is by hydrocracking or fluid catalytic cracking;
optionally subjecting one or more of the first, second and third naphtha sources deep hydrodesulfurization and deep hydrodenitrogenation;
catalytically reforming all or a portion of naphtha from the first, second and third naphtha sources, optionally subjected to deep hydrodesulfurization and deep hydrodenitrogenation, to produce reformate; and
reacting all or a portion of the reformate in the presence of a hydrogenation catalyst containing 0.01-5 wt % of one or more active metal components selected from Pt, Pd, Re and a combination comprising at least two of Pt, Pd or Re, and on a support containing zeolite at a concentration range of 0.1-20 wt %, at conditions including at a reactor temperature (° C.) in the range of from about 250-320, at a hydrogen partial pressure (bar) in the range of from about 40-100, at a hydrogen gas feed rate (standard liters per liter of hydrocarbon feed, SLt/Lt) of up to about 500-3000, and at a liquid hourly space velocity ($h^{-1}$), on a fresh feed basis relative to the hydrogenation catalysts, in the range of from about 0.1-5.0, the catalyst and conditions being effective to produce a liquid hydrogenation effluent hydrogen carrier in which at least about 95-99.9 wt % of C6-C8 aromatic hydrocarbons in the reformate are converted to cyclohexanes.

16. The process of claim 15, further comprising
separating light naphtha from one or more of the first, second and third naphtha sources, optionally subjected to deep hydrodesulfurization and deep hydrodenitrogenation,
aromatizing all or a portion of light fraction to produce an aromatic hydrocarbon stream comprising at least benzene, toluene, xylene, and C9+ aromatic hydrocarbons, and
combining all or a portion of the aromatic hydrocarbon stream from aromatizing with the reformate.

17. The process as in claim 15, further comprising: treating at least a portion of the vacuum residue to produce at least naphtha-range hydrocarbons as a fourth naphtha source, wherein treating is by hydrotreating followed by hydrocracking, hydrotreating followed by fluid catalytic cracking, or delayed coking; optionally subjecting naphtha from the fourth naphtha source to deep hydrodesulfurization and deep hydrodenitrogenation, and wherein catalytic reforming further comprises reforming all or a portion of the fourth naphtha source, optionally subjected to deep hydrodesulfurization and deep hydrodenitrogenation; and gasifying heavy products from treating vacuum residue including pitch wherein treating is by hydrotreating followed by hydrocracking, heavy cycle oil wherein treating is by hydrotreating followed by fluid catalytic cracking, or heavy coker gas oil and/or coke wherein treating is by delayed coking, or coke wherein treating is by delayed coking, wherein gasifying produces hydrogen that used during reaction of reformate in the presence of a hydrogenation catalyst to produce cyclohexanes.

18. The process as in claim 15, further comprising: treating at least a portion of the vacuum residue by solvent deasphalting to produce asphalt and deasphalted oil, wherein all or a portion of the deasphalted oil is treated with vacuum gas oil; and gasifying asphalt from solvent deasphalting; wherein gasifying produces hydrogen that used during reaction of reformate in the presence of a hydrogenation catalyst to produce cyclohexanes.

19. The process as in claim 15, wherein the hydrogenation catalyst contains one or more active metal components selected from Pt, Pd, Re and a combination comprising at least two of Pt, Pd or Re, and wherein the catalyst support of the hydrogenation catalyst comprises zeolite at a concentration range of 0.1-20 wt % and non-acidic amorphous alumina.

20. An integrated refinery process comprising:
catalytically reforming naphtha-range hydrocarbons to produce reformate containing C6-C8 aromatic hydrocarbons, wherein the naphtha-range hydrocarbons are obtained from a source within the refinery selected from the group consisting of
 a first naphtha source consisting of naphtha-range hydrocarbons derived from naphtha hydrotreating of straight run naphtha,
 a second naphtha source consisting of naphtha-range hydrocarbons derived from hydrocracking of straight run middle distillates,
 a third naphtha source consisting of naphtha-range hydrocarbons derived from treatment of vacuum gas oil by (a) hydrocracking of vacuum gas oil or (b) fluid catalytic cracking of vacuum gas oil,
 a fourth naphtha source consisting of naphtha-range hydrocarbons derived from treatment of vacuum residue by (a) residue hydrotreating of vacuum residue followed by hydrocracking of hydrotreated vacuum residue, (b) residue hydrotreating of vacuum residue followed by fluid catalytic cracking of hydrotreated vacuum residue, or (c) coking of vacuum residue,
 combinations comprising of two or more of the foregoing, and
 combinations comprising one or more of the foregoing and an additional deeply hydrotreated naphtha source; and
reacting all or a portion of the reformate in the presence of a hydrogenation catalyst containing wt % of one or more active metal components selected from Pt, Pd, Re and a combination comprising at least two of Pt, Pd or Re, on a catalyst support comprising non-acidic amorphous alumina and about 0.1-15 wt % of a modified USY zeolite having one or more of Ti, Zr and/or Hf substituting aluminum atoms constituting the zeolite framework thereof, at conditions including at a reactor temperature (° C.) in the range of from about 250-320, at a hydrogen partial pressure (bar) in the range of from about 20-100, at a hydrogen gas feed rate (standard liters per liter of hydrocarbon feed, SLt/Lt) of up to about 500-3000, and at a liquid hourly space velocity ($h^{-1}$), on a fresh feed basis relative to the hydrogenation catalysts, in the range of from about 0.1-5.0, the catalyst and conditions being effective to produce a liquid hydrogenation effluent in which at least about 95-99.9 wt % of C6-C8 aromatic hydrocarbons in the reformate are converted to cyclohexanes.

* * * * *